United States Patent

[11] 3,613,004

[72] Inventor Keith H. Wycoff
P. O. Box 308, Lexington, Nebr. 68850
[21] Appl. No. 350,163
[22] Filed Mar. 9, 1964
[45] Patented Oct. 12, 1971

[54] SEQUENTIAL TONE SELECTIVE CALLING COMMUNICATION SYSTEM AND COMPONENTS THEREOF
16 Claims, 12 Drawing Figs.

[52] U.S. Cl. .......... 325/55, 325/64, 325/392, 325/478, 340/171
[51] Int. Cl. .......... H04q 7/02, H04b 5/04
[50] Field of Search .......... 325/55, 64, 51, 392, 466, 478; 340/171, 223, 311, 171 PF, 170; 343/225, 226, 288, 177; 331/60, 76, 51, 50

[56] References Cited

UNITED STATES PATENTS

| | | | |
|---|---|---|---|
| 2,523,315 | 9/1950 | Mayle | 325/392 |
| 2,524,782 | 10/1950 | Ferrar et al. | 325/64 X |
| 2,929,921 | 3/1960 | Clark, Jr. | 325/466 |
| 2,974,221 | 3/1961 | Peth | 325/55 |
| 2,980,794 | 4/1961 | Hargreaves et al. | 325/64 |
| 3,094,661 | 6/1963 | Herrman et al. | 325/55 |
| 3,198,888 | 8/1965 | Lemelson | 179/41 |
| 2,935,605 | 5/1960 | Mathieu | 325/64 X |

*Primary Examiner*—Benedict V. Safourek
*Attorney*—Prangley, Clayton, Mullin, Dithmar & Vogel

CLAIM: 1. In a communication system for selectively transmitting carrier signals carrying a control tone and a call-indicator tone and intelligence from a transmitter to at least one selected receiver, the combination comprising a transmitter including a tone-generating circuit for generating a preselected control tone, means for generating a call-indicator tone, a modulating circuit for modulating the carrier signals in accordance with the control tone and the control-indicator tone and the intelligence to be transmitted, a transmitter output circuit coupled to said modulating circuit for transmitting the carrier signals including the control tone and the call-indicator tone and the intelligence to be transmitted, a receiver including an input circuit for receiving the signals from said transmitter, a detecting circuit coupled to said input circuit for detecting the control tone and the call-indicator tone and the intelligence in the signals, an audio circuit for converting the intelligence into sound waves, a coupling circuit coupling said detecting circuit to said audio circuit for coupling the intelligence and the control tone thereto, a squelch circuit coupled to said coupling circuit and operative in a first condition thereof to render said coupling circuit inoperative and operative in a second condition thereof to render said coupling circuit operative, a first control circuit coupled to said squelch circuit and responsive to the application of the carrier signals to said receiver for generating a first control signal, a second tone control circuit coupled to said squelch circuit and responsive to the application of the control tone to said receiver for generating a second control signal, and squelch circuit being responsive to the application thereto of said first and second control signals for actuating said squelch circuit from the first condition thereof into the second condition thereof to render said coupling circuit operative to pass the call-indicator tone therethrough, means for maintaining said squelch circuit in the second condition thereof until the removal of said first control signal therefrom, a third tone control circuit coupled to said coupling circuit and responsive to the application thereto of the call-indicator tone from said coupling circuit for producing an output from said third tone control circuit, and a call-indicator annunciator coupled to said third control circuit and actuated by the output therefrom, whereby said receiver is operative to operate said call-indicator annunciator upon the application thereto of both the control tone and the call-indicator tone from said transmitter, the removal of said first control signal from said squelch circuit changing said squelch circuit from the second condition thereof to the first condition thereof to render said coupling circuit inoperative.

16. A communication system comprising:

transmitter for transmitting a signal including a radio frequency carrier, modulating means for modulating said carrier, control means for initiating the operation of said modulation means for first causing said modulation means to modulate said carrier with a first frequency signal for a time period of predetermined limited duration and for immediately thereafter causing said modulation means to modulate said carrier with a different frequency signal to thereby cause said transmitter means to first transmit said carrier modulated by a burst of said first frequency signal and then transmit said carrier modulated by a second frequency signal, a receiver including means for receiving and demodulating the signal transmitted from said transmitter to provide an output including said burst of said first frequency signal followed by said second frequency signal, a normally operative first decoding circuit means and a normally inoperative second decoding circuit means each connected to be supplied with said output and a utilization circuit means controlled by said second decoding circuit means, said first decoding circuit means having means responsive to said burst of said first frequency signal in the output from said receiver for rendering said second decoding circuit operative for a time period of predetermined limited duration overlapping the time during which said output includes said second frequency signal, said second decoding circuit means having means responsive to said second frequency signal in the output of said receiver for causing energization of said utilization circuit means.

90

INVENTOR.
KEITH H. WYCOFF
BY Prangley, Baird, Clayton, Miller & Vogel
ATTYS.

INVENTOR.
KEITH H. WYCOFF
BY
Mangley, Baird, Clayton, Miller & Vogel
ATTYS.

PATENTED OCT 12 1971 3,613,004

SHEET 05 OF 10

INVENTOR.

KEITH H. WYCOFF

BY Prangley, Baird, Clayton, Miller & Vogel

ATTYS.

INVENTOR.
KEITH H. WYCOFF
BY
Prangley, Baird, Clayton Miller & Vogel
ATTYS.

INVENTOR
KEITH H. WYCOFF
BY
Prangley, Baird, Clayton, Miller & Vogel
ATTYS.

INVENTOR.
KEITH H. WYCOFF
BY
Prangley, Baird, Clayton, Miller & Vogel
ATTYS.

INVENTOR
KEITH H. WYCOFF
BY
Prangley, Baird, Clayton, Miller & Vogel
ATTYS.

INVENTOR
KEITH H. WYCOFF
BY Prangley, Baird, Clayton, Miller & Vogel.
ATTYS.

SEQUENTIAL TONE SELECTIVE CALLING COMMUNICATION SYSTEM AND COMPONENTS THEREOF

The present invention relates to communication systems, and particularly to communication systems for selectively transmitting intelligence from a transmitter to at least one selected receiver.

The principles of the present invention are equally applicable to communication systems utilizing transmission by wire lines, transmission by a modulated supersonic signal, transmission by AM radio and transmission by FM radio. However, certain features of the invention are most useful when applied to communication systems utilizing FM radio transmission, and accordingly, for the purposes of illustration the invention will be illustrated as applied to FM radio communication systems, and particularly to mobile FM radio communication systems.

There have been several systems utilized heretofore for selectively calling one or more receivers in a mobile FM radio system, all of which prior systems have exhibited substantial disadvantages in use. One such prior system utilizes a "subaudible" tone superimposed upon the normal voice modulation, the tone being present during the entire transmission i.e., the presence of the subaudible tone maintains the associated receiver being called in the receiving condition, loss of the subaudible tone causing the receiver to be placed in a nonreceiving condition. Such a system presents serious problems due to the difficulty of modulating an FM radio signal at low frequencies. Special filtering is required at the receiver to remove the subaudible tone from the speech so that it will not interfere therewith, low-frequency filters suitable for such service being bulky and expensive. Nonusers of the equipment operating on the same channel are inconvenienced in that they must listen to an objectionable rumble in their receiver every time a transmission is made by a user of the subaudible tone control system.

Another prior tone control system used heretofore in mobile FM radio communication systems utilized an audible tone of higher frequency to alert the intended receiver. Reception of the tone by the intended receiver may, for example, actuate a light, thus signalling the user to manually turn on the receiver. Alternatively, the tone of higher frequency may be applied through the receiver output automatically to actuate the receiver into a receiving condition. This system has certain undesirable features including a substantial time delay which must be waited out while the control tone or tones are being transmitted, and once the receiver has been either manually or automatically turned on, the receiver must be manually reset or turned off at the end of the transmission.

Yet another prior control system has utilized a dialing apparatus which sends a sequence of pulses that operate a series of stepping switches in the receiver. Considerable time delay is involved in the selection process and substantial effort is involved on the part of the operator. The equipment in such systems is also bulky and problems are encountered in attempting to install such equipment in the limited space available in most mobile installations.

Accordingly, it is an important object of the present invention to provide an improved selective calling communication system, and particularly an improved tone-controlled communication system for selectively transmitting intelligence from a transmitter to at least one selected receiver.

Another object of the invention is to provide an improved communication system of the type set forth wherein a plurality of harmonically related control tones are utilized in calling a selected receiver.

Yet another object of the present invention is to provide a communication system of the type set forth wherein a carrier signal and a control tone are transmitted by the transmitter to the selected receiver, the simultaneous application of the carrier signal and the control tone to the receiver being necessary to render the receiver operative.

In connection with the foregoing object, it is another object of the invention to provide an improved communication system of the type set forth wherein the receiver once rendered operative remains operative until the removal of the carrier signal therefrom and independently of the removal therefrom of the control tone.

Still another object of the invention is to provide a communication system of the type set forth in which the receiver is actuated into the operating condition thereof by the application thereto and subsequent removal therefrom of a control tone.

In connection with the foregoing object, it is another object of the invention to provide a communication system of the type set forth wherein the receiver is actuated into the operative condition thereof by the application thereto and subsequent removal therefrom of the control tone simultaneously with the application thereto of a carrier signal.

Yet another object of the invention is to provide in a communication system of the type set forth an improved call indicator circuit.

Still another object of the invention is to provide in a communication system of the type set forth an improved tone-generating circuit for the transmitter wherein a single fundamental frequency oscillator is provided that is continuously operating and is coupled to a nonoscillating frequency divider to provide the desired control tones.

In connection with the foregoing object, another object of the invention is to provide an improved tone-generating circuit of the type set forth wherein electronic switching is provided to switch from one control tone to the next.

Further in connection with the foregoing objects, another object of the invention is to provide an improved transmitter wherein the control tones generated therein are harmonically related one to the other.

Still another object of the invention is to provide an improved transmitter of the type set forth including a paging alarm circuit providing a central timer for controlling the paging signal duration and repetition rate.

Yet another object of the present invention is to provide an improved receiver for a communication system of the type set forth which is tone controlled and which has no output therefrom except when that particular receiver is being called.

In connection with the foregoing object, another object of the invention is to provide an improved receiver of the type set forth in which the selection process is accomplished by the application of one or more short bursts of tone to the receiver preceding the transmission of intelligence thereto.

A further object of this invention is to provide a selective calling system in which no tones used in selecting the receiver of the system are heard in the output of the receiver.

In connection with the foregoing object, another object of the invention is to provide an improved receiver of the type set forth in which the receiver once rendered operative will continue in the operative condition despite short interruptions of the carrier signal but will be rendered inoperative upon the termination of the carrier signal.

Still another object of the invention is to provide an improved tone control circuit for communications receivers which is fast operating, does not depend upon a fixed duration of tone, and is not subject to false activation by the harmonics of the control tone or by voice signals.

In connection with the foregoing object, it is another object of the invention to provide a tone control circuit having a substantially constant bandwidth of the control tone versus the signal level of the control tone, the response time of the tone control circuit being short relative to the bandwidth of the control filter, the tone control circuit having a constant time delay regardless of the signal levels of the control tone preceding or during the transmission thereof, the time delay period starting from zero if the control tone is interrupted during activation of the tone control circuit.

Yet another object of the invention is to provide a tone control circuit of the type set forth including a plurality of tone channels, the tone channels operating upon the application thereto and the subsequent removal therefrom of the selected control tone to actuate the next tone channel and finally the output circuit to be controlled thereby.

A further object of the present invention is to provide an improved squelch circuit for receivers of the type set forth, and particularly an improved squelch-latching circuit for maintaining the squelch tube in the desired condition thereof when once placed in that condition.

A further object of the invention is to provide an improved receiver of the type set forth including an improved monitor circuit.

Further features of the invention pertain to the particular arrangement of the elements of the communication systems, the transmitter therefor, the receiver therefor, and the component circuits thereof, whereby the above outlined and additional operating features thereof are attained.

The invention, both as to its organization and method of operation together with further objects and advantages thereof will best be understood by reference to the following specification taken in connection with the accompanying drawings, in which.

Figure 1:
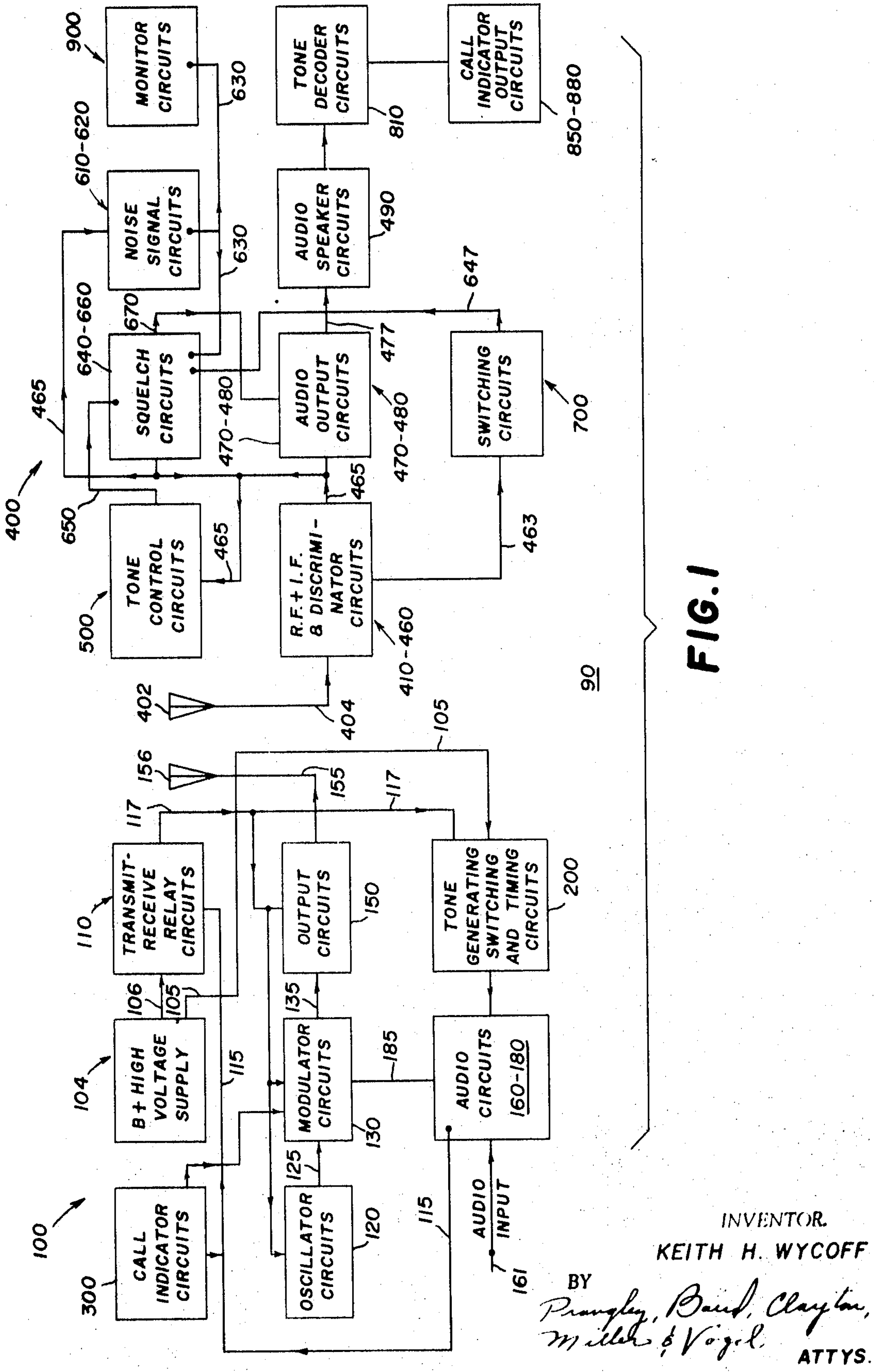
FIG. 1 is a schematic diagram of a communication system made in accordance with and embodying the principles of the present invention, the transmitter and the receiver embodying the system being illustrated in block form.

As has been explained heretofore, the principles of the present invention are equally applicable to communication systems utilizing wire lines, modulated supersonic signals, AM radio signals, and FM radio signals. For the purposes illustrated, there is shown in the drawings a communication system employing FM radio signals. Those skilled in the art will readily understand that the various principles to be described hereafter in conjunction with the system employing FM radio signals can be readily adapted to the other types of communication systems using other forms of transmission set forth above.

Referring to FIG. 1 of the drawings there is shown a mobile FM radio communication system made in accordance with and embodying the principles of the present invention, the system being generally designated by the numeral 90. The system 90 includes an FM transmitter 100 and an FM receiver 400, it being understood that the transmitter 100 and/or the receiver 400 may be either fixed or mobile, each operating station typically containing both a transmitter 100 and a receiver 400.

The transmitter 100 includes a $B^+$ high-voltage supply 104, the output of which is applied through a transmit-receive relay circuit 110 to the other components of the transmitter via a conductor 117. The usual oscillator circuits 120 are provided, the output of which is applied via the conductor 125 to the usual modulator circuits 130 which in turn have the output thereof connected by a conductor 135 to output circuits 150, the output circuits 150 being connected by a conductor 155 to a transmitting antenna 156. Intelligence is impressed upon the transmission by the audio circuits 160–180 which have as an input thereto voice signals on a conductor 161 and control tones from a tone generating, switching and timing circuit 200. One output from the audio circuits 160–180 is a control signal on a conductor 115 which is supplied to the transmit-receive relay circuit 110 for applying operating potential via the conductor 117 to the oscillator circuits 120, the modulator circuits 130, the output circuits 150 and the tone generating, switching and timing circuits 200. Another output from the audio circuits 160–180 is applied via the conductor 185 to the modulator circuits 130 to impress intelligence and/or control tones on the transmission from the transmitter 100. There further are provided call indicator circuits 300 which are connected to the transmit-receive relay circuits 110 and the modulator circuits 130.

The transmissions from the transmitter 100 are adapted to be received by the receiver 400 and more particularly by the antenna 402 thereof which is connected by a conductor 404 to the usual RF and IF and detecting or discriminator circuits 410–460. One output from the circuits 410–460 appears on the conductor 463 which applies a DC potential from the discriminator to the switching circuit 700 which in turn applies a control signal along the conductor 647 to the squelch circuits 640–660. Another signal from the circuits 410–460 is applied by the conductor 465 to the audio output circuits 470–480, to the tone control circuits 500, to the squelch circuits 640–660 and to the noise signal circuits 610–620. The audio output circuits 470–480 in turn have the output thereof connected by a conductor 477, to the audio speaker circuit 490 which provides the usual audio output from the transmitter 400 and in accordance with the present invention also is connected to the tone-decoder circuits 810 which in turn are connected to the call indicator output circuits 850–880. The tone control circuits 500 have the output thereof applied by the conductor 650 to the squelch circuits 640–660 and the output of the squelch circuit is in turn applied on the conductor 670 to the audio output circuits 470–480 to control the operation thereof. Another input to the squelch circuit 640–660 is from the noise signal circuits 610–620 via the conductor 630, and another output from the noise signal circuits 610–620 appears on the conductor 630 which is applied to the monitor circuits 900.

Figure 2:
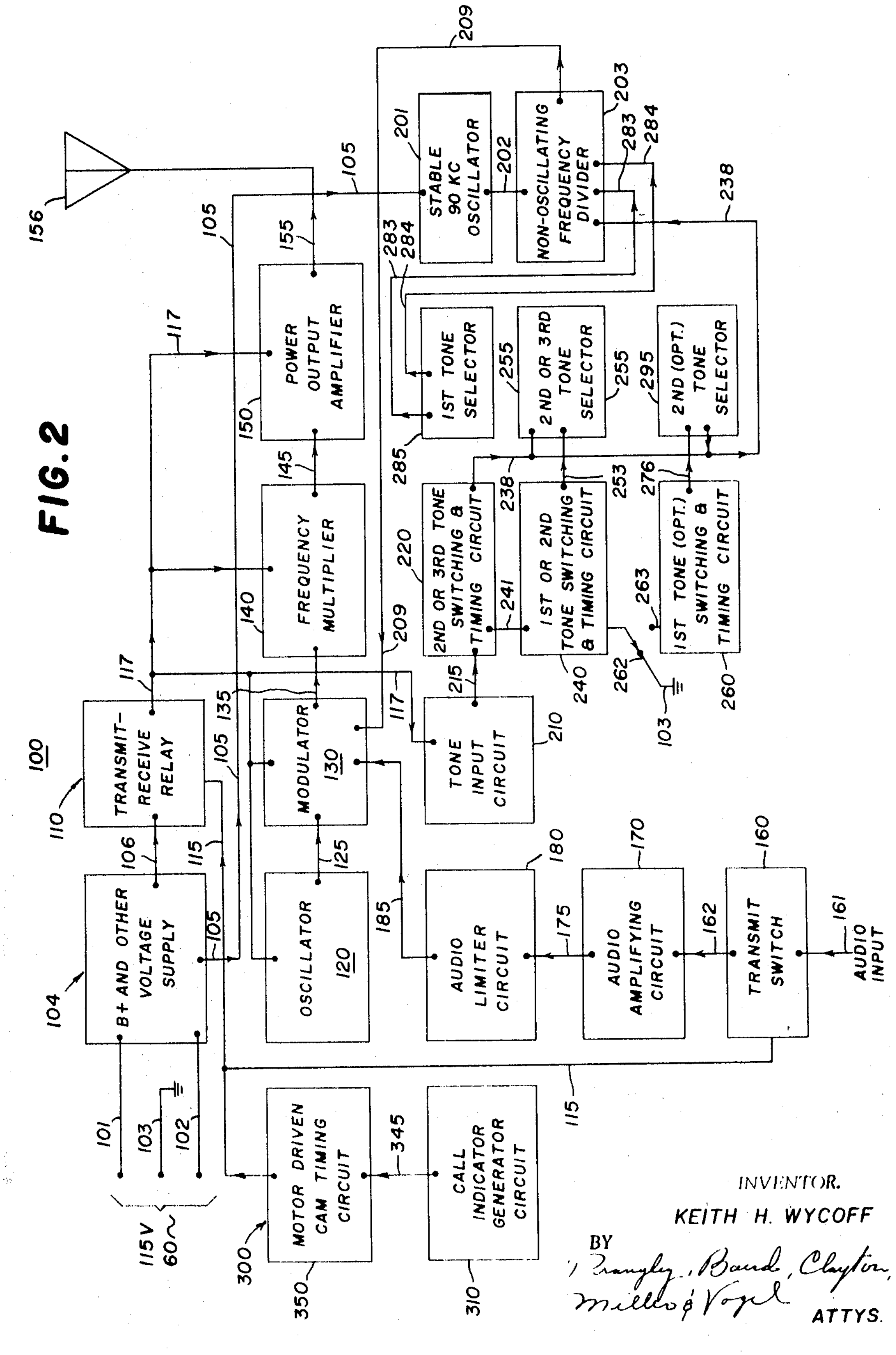
FIG. 2 is a more detailed schematic and block diagram of the transmitter forming a part of the communication system of FIG. 1.

A more detailed representation of the circuits in the transmitter 100 is set forth in FIG. 2 of the drawings wherein it will be seen that the $B^+$ voltage supply 104 is connected to a source of operating potential supplied thereto on the conductors 101, 102 and the grounded conductor 103. When the transmitter 100 is a stationary facility, the power applied to the conductors 101 and 102 may be from a conventional 115 volt 60 cycle AC source as illustrated, and when the transmitter 100 is a mobile installation, the power applied to the conductors 101 and 102 will be typically supplied from batteries or a portable generator; in short, any suitable electrical power source may be utilized to operate the $B^+$ voltage supply 104.

A first output of the voltage supply 104 appears on a conductor 105 and is applied as an input to a stable 90-kilocycle oscillator 201 forming a part of the tone-generating circuits, the oscillator 201 operating continuously when the transmitter 100 is in use. A second output from the voltage supply 104 appears on a conductor 106 connecting to the transmit-receive relay 110 which when actuated provides operating potential on the conductor 117 for the other operating components of the transmitter 100. Control of the transmit-receive relay 110 is accomplished by a transmit switch 160 which may be typically a button-type switch on the transmitting microphone which when actuated closes a circuit including the conductor 115 to actuate the transmit-receive relay 110. The relay 110 also is actuated by the paging alarm circuits 300 which includes a call-indicator generator circuit 310 which, for example, generates a control tone that is applied via a conductor 345 to a motor driven cam timing circuit 350 which applies to the conductor 115 a series of call-indicator tone pulses that suitably actuate the transmit-receive relay 110 to cause operation of the transmitter 100 to radiate a carrier signal having thereon a series of call-indicator tones of predetermined duration in accordance with the operation of the timing circuit 350.

The carrier signal for the transmitter 100 is provided by the oscillator 120 in combination with the frequency multiplier 140, the output of the oscillator 120 being first fed to the modulator 130 via the conductor 125 and the output of the modulator 130 being applied to the frequency multiplier 140 via the conductor 135. The usual audio circuits are provided, the audio input on the conductor 161 being applied through the transmit switch 160 and the conductor 162 to the audio-amplifying circuit 170, the output of which is applied via the conductor 175 to the audio-limiter circuit 180 which in turn has the output thereof on the conductor 185 applied as an input to the modulator 130.

In accordance with the present invention the control tones for the selective calling of receivers by the transmitter 100 are generated by dividing the frequency output of the stable 90-kilocycle oscillator 201, the output of the oscillator 201 being applied on the conductor 202 as an input to a nonoscillating-type frequency divider 203. As will be described in more full detail hereinafter, the frequency divider 203 is operative to provide a series of harmonically related tones dependent upon the setting of a series of tone selectors 255, 285, and 295. The first tone selector 285 has impedance elements therein which are connected to the frequency divider 203 by means of conductors 283 and 284. The second tone selector 255 (and the third tone selector when three tones are used) has the output thereof connected to the frequency divider 203 by the conductor 238 as does the tone selector 295 which is the selector for the second tone when a series of three control tones is utilized.

The selection and duration of operation of each of the tones in the series of control tones transmitted by the transmitter 100 is under the control of a tone input circuit 210 and a series of tone switching and timing circuits 220, 240 and 260. When a two tone sequence of control tones is to be utilized, a switch 262 connected to the tone switching and timing circuit 240 is placed in the position illustrated in FIG. 2, i.e., in connection with the grounded conductor 103, and this connects the circuit 240 as the first tone switching and timing circuit and connects the circuit 220 as a second tone switching and timing circuit. The tone input circuit 210 has the output thereof connected via a conductor 115 as one of the inputs to the switching circuit 220, and the switching circuit 220 is in turn connected by the conductor 238 to the second tone selector 255 and the frequency divider 203; the switching circuit 220 is further connected by the conductor 241 to the first tone switching and timing circuit 240. The output of the switching circuit 240 is connected via the conductor 253 to the second tone selector 255.

When a series of three control tones is to be utilized in the selective calling of receivers by the transmitter 100, the switch 262 is changed from the position illustrated in FIG. 2 to a position wherein it is connected to the conductor 263 of the switching and timing circuit 260. With the parts in this position, the circuit 260 becomes the first tone switching and timing circuit and has the output thereof connected to the second tone selector 295. The circuit 240 becomes the second tone switching and timing circuit and has the output thereof connected to the tone selector 255 which is now the third tone selector; and the circuit 220 becomes the third tone switching and timing circuit and has the output thereof connected via the conductor 238 to the third tone selector 255, the second tone selector 295 and the frequency divider 203.

The series of tones generated by the tone circuits described above are applied via the conductor 209 as an input to the modulator 130 and are thereby applied to the fundamental frequency of the oscillator 120. The output of the modulator 130 is fed to the frequency multiplier 140 and thence via the conductor 145 to the power output amplifier, both of which operate in the conventional manner to provide a modulated carrier signal on the conductor 155 which is connected to the transmitting antenna 156.

Figures 3, 3A:
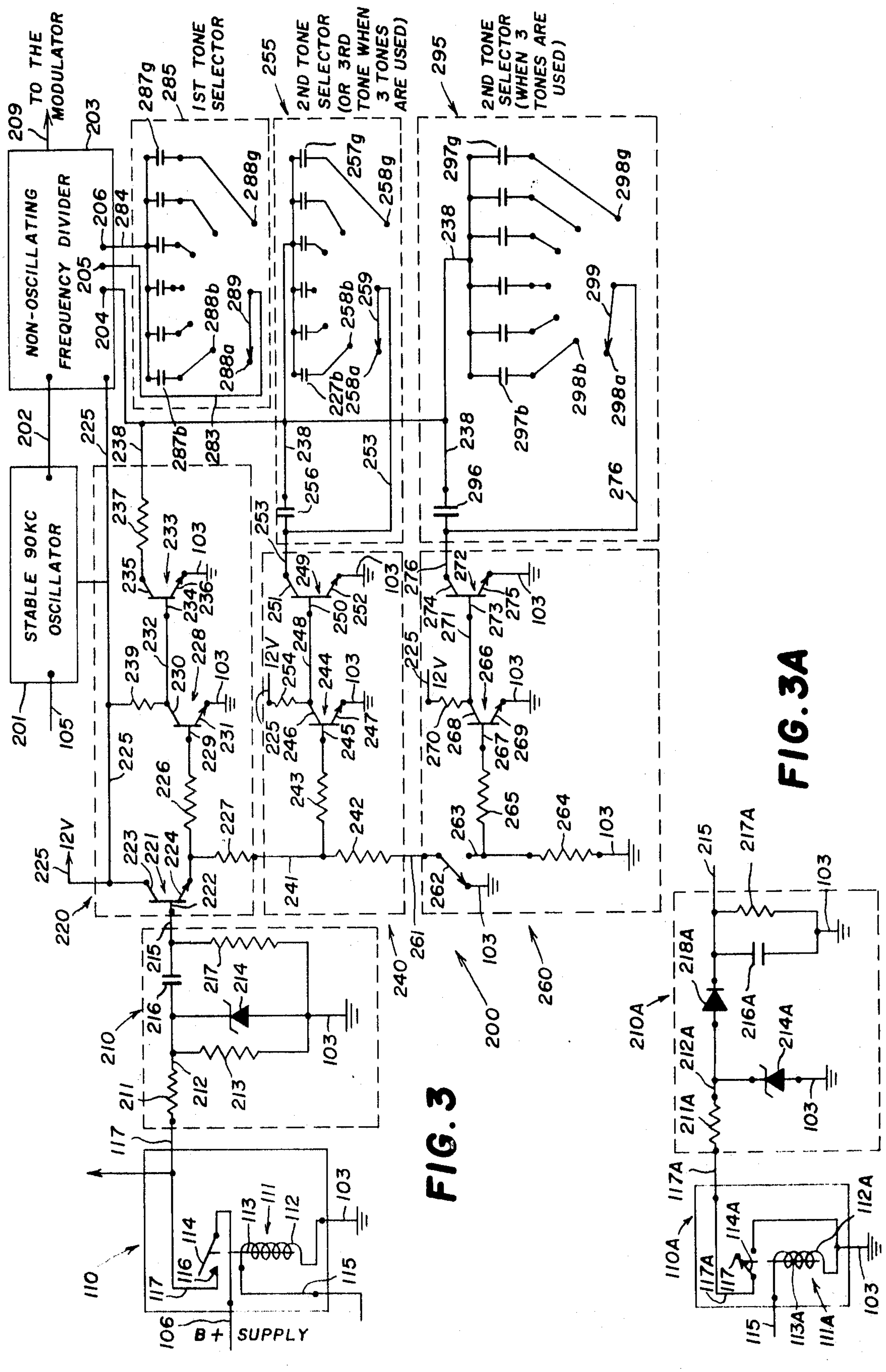
FIG. 3 is a schematic electrical diagram of the tone generating, switching and timing circuits forming a part of the transmitter of FIG. 2.
FIG. 3A is a schematic electrical diagram showing a modification of a portion of the circuit of FIG. 3.

Referring to FIG. 3 of the drawings there is illustrated one preferred embodiment of the transmit-receive relay 110, the tone input circuit 210, the tone switching and timing circuits 220, 240 and 260, and the tone selectors 255, 285 and 295. It will be seen that the transmit-receive relay 110 includes the usual transmit relay 111 having a coil 112 of which one terminal is connected to the grounded conductor 103 and the other terminal is connected to the conductor 115 connected to the transmit switch 160 in the usual manner. An armature 113 is provided connected to a movable switch contact 114 to which is applied the $B^+$ voltage by connection to the conductor 106. The contact 114 is adapted to cooperate with a stationary contact 116 which is connected to the conductor 117. Closure of the transmit switch 160 completes a circuit through the coil 112 thus causing the armature 113 to move downwardly to bring the contacts 114 and 116 together thus to apply the $B^+$ potential from the conductor 106 to the conductor 117.

The conductor 117 is connected to one terminal of an input resistor 211 forming a part of the tone input circuit 210, the other terminal of the resistor 211 being connected to a conductor 212. The conductor 212 is connected to one terminal of the input resistor 213 which has the other terminal thereof grounded by the conductor 103 and to one terminal of a Zener diode 214 which also has the other terminal thereof grounded by the conductor 103. In a typical installation which will be described for purposes of illustration, the $B^+$ potential on the conductor 117 can be for example 200 volts, the Zener diode 214 may be the type which becomes conducting at 9 volts and the resistor 211 has a value of 20,000 ohms and the resistor 213 has a value of 2,000 ohms. Accordingly, there will be provided on the conductor 212 a substantially constant potential of 9 volts which is applied as a charging potential to an input capacitor 216 having one terminal connected to the conductor 212 and the other terminal connected through a resistor 217 to the grounded conductor 103. The capacitor 216 typically has a value of 0.1 microfarad and the resistor 217 has a value of 1.0 megohm. Therefore when the relay 111 operates to apply $B^+$ potential to the conductor 117, the capacitor 216 begins to charge through the resistor 217 and the other circuits in parallel therewith and connected to the conductor 215.

The conductor 215 is connected to the tone switching and timing circuit 220 and more specifically to the base 222 of an input transistor 221 thereof which as illustrated is of the NPN type. The collector 223 is connected to a conductor 225 to which is applied an operating potential (for example, +12 volts), and the emitter 224 is connected to the junction of resistors 226 and 227. The resistor 227 is further connected to a conductor 241 in the tone-switching circuit 240 which is further connected through a resistor 242 and the conductor 261 to the switch 262; as illustrated in FIG. 3 the switch 262 is in a position so that it is connected to the grounded conductor 103, whereby the resistors 227 and 242 provide a voltage-divider network to ground from the emitter 224 of the transistor 221. The other terminal of the resistor 226 is connected to the base 229 of a transistor 228 also of the NPN type, the collector 230 of the transistor 228 being connected through a resistor 239 to the conductor 225 carrying the operating potential and the emitter 231 is connected to the grounded conductor 103. The collector 230 is further connected by a conductor 232 to the base 234 of another transistor 233 of the NPN type, the collector 235 thereof being connected by a resistor 237 to the conductor 238, and the emitter 236 thereof being connected to the grounded conductor 103.

The tone switching and timing circuit 240 has as an input thereto the conductor 241 described above which in addition to connecting to the resistor 242 also connects to one terminal of a resistor 243 which has the other terminal thereof connected to the base 245 of a transistor 244 of the NPN type. The collector 246 of the transistor 244 is connected through a conductor 248 and a resistor 254 to the conductor 225 carrying the operating potential; the emitter 247 is connected to the grounded conductor 103. The conductor 248 also is connected to the base 250 of another transistor 249 of the NPN type which has the collector 251 thereof connected to the conductor 253 and has the emitter 252 thereof connected to the grounded conductor 103.

The tone switching and timing circuit 260 can be switched into and out of the tone-generating circuit 200 as desired by means of the switch 262, and when it is desired to include the circuit 260 in the tone-control generating circuit 200, the switch contact 262 is moved from the position illustrated in FIG. 3 to a position connecting with the conductor 263. The conductor 263 is connected to one terminal of a resistor 264 which has the other terminal thereof connected to the grounded conductor 103. The conductor 263 also is connected to one terminal of the input resistor 265 which has the other terminal thereof connected to the base 267 of a transistor 266 of the NPN type. The collector 268 of the transistor 266 is connected by a conductor 271 and a resistor 270 to the conductor 225 carrying the operating potential, and the emitter 269 is connected to the grounded conductor 103. The conductor 271 further is connected to the base 273 of a transistor 272 of the NPN type, the collector 274 being connected to a conductor 276 and the emitter 275 thereof being connected to the grounded conductor 103.

The tone selector circuit 255 comprises a plurality of impedances and a selector switch 259. The conductor 253 is connected to one terminal of a capacitor 256 which has the other terminal thereof connected to the conductor 238, the conductor 238 being connected to a terminal 204 of the frequency divider 203. The conductor 253 further is connected to a movable switch arm 259 which is movable into contact with any one of a seven selected switch contacts 258*a* through 258*g*. The switch contact 258*a* has no connection thereto but each of the switch contact 258*b* through 258*g* connects to one terminal of an associated capacitor 257*b* through 257*g*, the other terminal of each of the capacitors being connected to the conductor 238. Accordingly, the tone selector 255 is operative to select one of seven tones, the tone selected depending upon the position of the movable switch contact 259, the position of the switch contact 259 in turn determining which if any of the various capacitors are connected in the frequency-determining circuits of the frequency divider 203.

The tone selector 285 is constructed substantially like the tone selector 255, and more specifically, a conductor 283 is provided interconnecting a terminal 205 on the frequency divider 203 and a movable switch contact 289. The switch contact 289 is selectively movable into connecting relationship with seven fixed switch contacts 288*a* to 288*g*. Each of the switch contacts 288*b* through 288*g* connects with one terminal of a frequency-determining capacitor 287*b* to 287*g*, respectively, the other terminals of the capacitors being connected by a conductor 284 to the other input terminal 206 of the frequency divider 203.

The tone selector 295 likewise is constructed like the tone selector 255 and more particularly includes an input capacitor 296 having one terminal thereof connected to the conductor 276 and having the other terminal thereof connected to the conductor 238. The conductor 276 also connects with a movable switch arm 299 which is movable selectively into contact with stationary switch contacts 298*a* to 298*g*. Each of the switch contacts 298*b* through 298*g* is respectively connected to one terminal of capacitors 297*b* to 297*g*, the other terminals of the capacitors being connected to the conductor 238.

In the operation of the tone-generating circuit 200, the oscillator 201 is continuously operating at its fixed and stable frequency of 90,000 cycles and the output thereof is connected via the conductor 202 to the nonoscillating-frequency divider 203. The frequency divider 203 has certain of the frequency-determining components disposed therein and the remainder are provided by the tone selectors 255, 285 and/or 295, the various frequency-determining components being selected to provide a series of harmonically related tones, for example, seven in number, and having frequencies which are certain fractions of the 90,000-cycle frequency of the oscillator 201, such for example, as 1/12, 1/13, 1/14, 1/15, 1/16, 1/17 and 1/18, the precise tone generated and applied on the output conductor 209 being determined by the setting of the movable switch contacts 259, 289 and 299, respectively.

The manner in which the circuits 210, 220, 240 and 260 automatically operate electronically to switch from one tone to another will now be described. Assuming first that a sequence of two tones is to be generated, the switch 262 is first placed in the position illustrated in FIG. 3, i.e., in contact with the grounded conductor 103 so that only circuits 210, 220, 240, 255 and 285 are operative. The operator selects the desired tones by means of the tone selector circuits 255 and 285, the first tone being selected by the position of the switch contact 289 in the circuit 285, and the second tone being selected by the position of the switch contact 259 in the circuit 255. The oscillator 201 will be operating at all times, and the frequency divider 203 will have an output determined by the position of the switch arm 289 of the first tone selector 285, the first tone so generated being a submultiple of the 90,000-cycle oscillator tone and being applied along the conductor 209 to the modulator 140 and thus transmitted as soon as the transmitter is on the air; this first tone will proceed until the tone-switching circuit 240 operates.

Upon actuation of the relay 110, $B^+$ potential of 200 volts will be applied to the conductor 117 and the operation of the Zener diode 214 will provide a 9-volt operating potential on the conductor 212. The capacitor 216 will immediately begin to charge rapidly, maximum current flowing in the input transistor 221 initially and thereafter decaying as the capacitor 216 becomes charged. The heavy conduction of the transistor 221 causes a substantial voltage drop across the resistors 227 and 242 and saturates the transistors 228 and 244 which serves to block the transistors 233 and 249, respectively. When the capacitor 216 is nearly charged, the voltage drop across the resistor 242 becomes so small that the transistor 244 blocks thereby permitting the transistor 249 to begin conducting and thereby connects the capacitor 256 in the frequency divider 203, thus changing the frequency output of the divider 203 in accordance with the setting of the second tone selector 255. The elapsed time between the operation of the transmit relay 111 and the electronic switching from the first tone to the second tone may be in the range from about 150 milliseconds to about 200 milliseconds, a typical preferred value being about 175 milliseconds.

The second tone persists until the switching circuit 220 operates. More particularly, as the capacitor 216 becomes nearly charged, the conduction through the resistors 227 and 242 become so small that the transistor 228 blocks and the transistor 233 begins to conduct heavily thus connecting the resistor 237 in the frequency divider 203 and blocks further output therefrom. The duration of the second tone may be, for example, from about 20 milliseconds to about 100 milliseconds, a typical example being about 60 milliseconds.

The tone-generating circuit 200 has many important advantages among the more important of which is that the oscillator 201 is continuously operating to provide a very steady and stable output of 90,000 cycles, all of the control tones being submultiples or divisions thereof. The frequency-determining elements in the tone selectors 255 and 285 are stable and inexpensive, yet provide rapid and positive operation of the frequency divider 203. Change from one tone to another is very rapid and essentially instantaneous, the switching being simply and accurately accomplished.

If it is desired to operate a three tone sequence, the switch contact 262 is operated from the position illustrated in FIG. 3 to a position wherein it is in connection with the conductor 263. With the parts so adjusted, the operator again selects the desired tones to be transmitted by the operation of the tone selectors, the first tone in the sequence being selected by the circuit 285 and particularly by the position of the contact 289 therein, the second tone being selected by the circuit 295 and particularly by the position of the switch contact 299 therein, and the third tone being selected by the circuit 255 and particularly by the position of the switch contact 259 therein. Even before closure of the transmit relay 111, the oscillator 201 will be operating and the first tone will be applied to the conductor 209 in accordance with the setting of the first tone selector 285, it being understood that the tone is not in fact transmitted since there is no operating potential on the modulator 130 and succeeding stages in the transmitter. Immediately upon closure of the transmit relay 111, the first control tone will be transmitted and in addition the capacitor 216 will begin to charge toward the 9-volt potential applied to the conductor 212 through a voltage-divider network including in series the resistors 264, 242 and 227, the transistor 221 being heavily conducting at this time. The heavy conduction through these resistors will produce substantial potential drops thereacross which will cause heavy conduction of the associated transistors 266, 244 and 228 thereby blocking the output of the transistors 272, 249 and 233, respectively. After the capacitor 216 has charged for a short time, for example, about 175 milliseconds, the potential drop across the resistor 264 will become so small that the transistor 266 will block thus permitting the transistor 272 to conduct thereby effectively connecting the capacitor 296 and perhaps one of the capacitors 297*b*–297*g* in the frequency-determining network of the frequency divider 203, thereby to produce a second tone at the output 209 thereof. Shortly thereafter, for example about 50 milliseconds later, the combined potential drop across the resistors 242 and 264 will be so small that the transistor 244 will cease conducting and thus permit the transistor 249 to begin conducting effectively to connect the capacitor 256 and perhaps one of the capacitors 257*b*–257*g* (depending upon the position of the switch arm 259) in the frequency-determining network of the frequency divider 203. Accordingly, the third control tone will now be produced in the output of the frequency divider 203 and particularly on the conductor 209 therefor. Shortly thereafter, for example about 50 milliseconds later, the combined potential drop across the resistors 227 and 242 and 264 will be so small that the transistor 228 will cease conducting, and thus permit the transistor 233 to begin conducting effectively to connect the resistor 237 in the network of the frequency divider 203 interrupting the operation thereof and the generation of the third tone.

The operation of the tone-generating circuits of FIG. 3 above is dependent upon the application of $B^+$ potential to the conductor 117. There is illustrated in FIG. 3A a modification of the structure wherein the operation of the circuits is effected by the removal of $B^+$ potential. More specifically, the circuit 110A includes a transmit relay 111A having a coil 112A with one terminal thereof connected to the conductor 115 and the other terminal thereof connected to the grounded conductor 103. The armature 113A thereof is connected to a movable switch contact 114A which in the position illustrated is connected to a contact connected to the $B^+$ conductor 117 and being movable into connection with another contact connected to the grounded conductor 103. A permanent connection is provided between the contact 114A and the conductor 117A. The conductor 117A connects to the input circuit 210A and more specifically to one terminal of an input resistor 211A, the other terminal of the resistor 211A being connected to the conductor 212A. The conductor 212A is connected to one terminal of a Zener diode 214A having the other terminal thereof grounded via the conductor 103, the diode 214A being for example of the type which conducts upon application of 9 volts thereto. The conductor 214A is also connected to one terminal of a diode 218A which has the other terminal thereof connected to the conductor 215. The conductor 215 also is connected to ground through a capacitor 216A and a resistor 217A.

In the operation of the input circuit of FIG. 3A, before transmission is begun, the movable contact 114A is in connection with the conductor 117 to apply $B^+$ to the conductor 117A, this serving to charge the capacitor 216A to the potential determined by the diode 214A, namely, 9 volts. Upon the actuation of the relay 111A, the movable contact 114A is grounded thus connecting the conductor 117A to ground. The capacitor 216A now discharges through the resistor 217A the transistor 221 being heavily conducting at this time and providing a substantial voltage drop across the resistors 227 and 242 to ground when the switch 262 is in the position illustrated in FIG. 3, or across the resistors 227, 242 and 264 to ground when the switch 262 is in connection with the conductor 263. As the capacitor 216A continues to discharge, the potential on the base of the transistor 221 decreases and the conduction thereof decreases thus causing a drop in the potentials across the resistors 227, 242 and 264 thus causing operation of the circuits 220, 240 and 260 in a manner described above with respect to FIG. 3.

Figure 4:
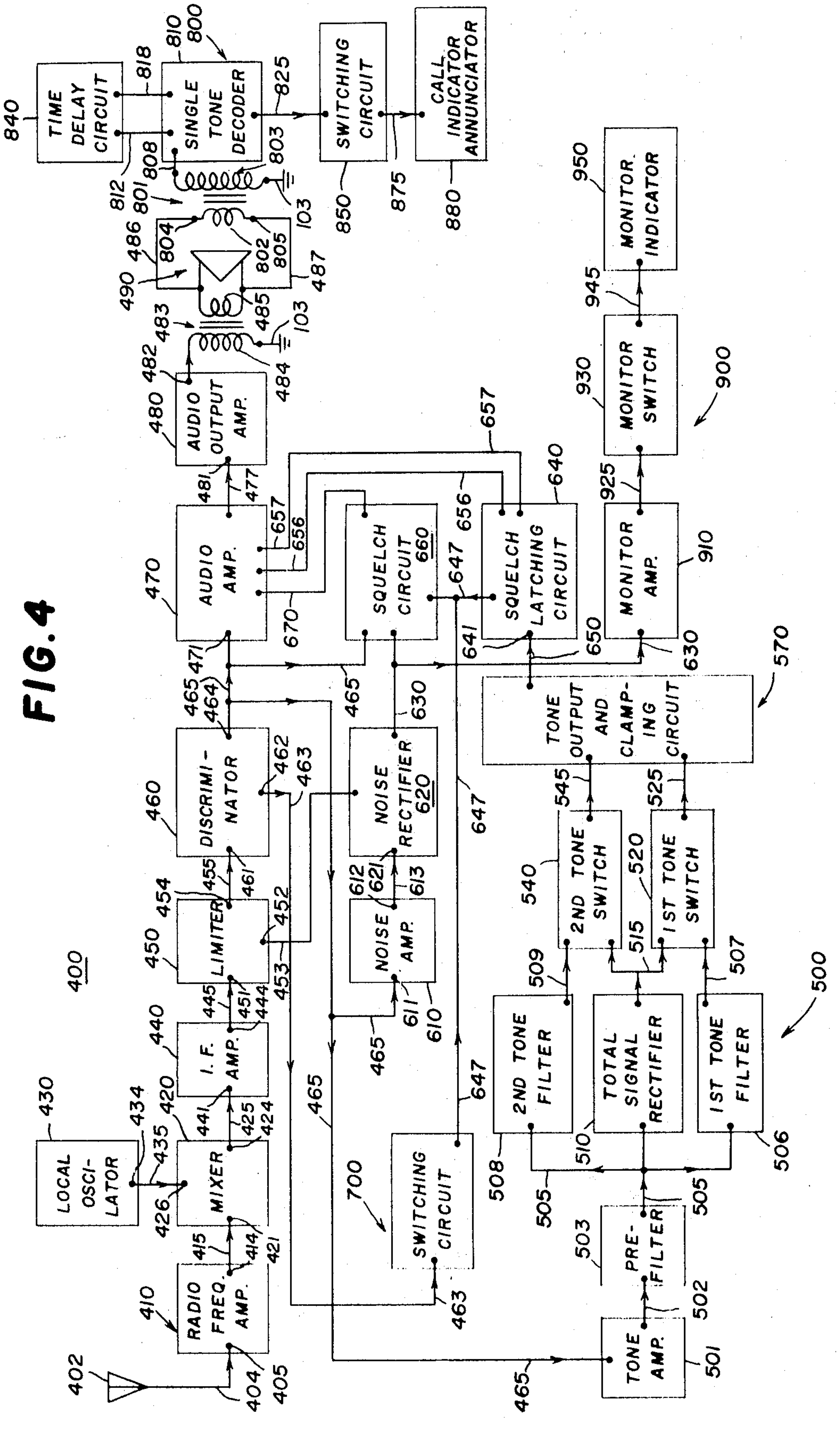
FIG. 4 is a more detailed block diagram of the receiver forming a part of the communication system illustrated in FIG. 1.

There is illustrated in FIG. 4 of the drawings a more complete block diagram of the radio receiver 400 forming a part of the communications system of the present invention. The carrier signal from the transmitter 100 is picked up on the antenna 402 and is conveyed by the conductor 404 to the input terminal 405 of a radiofrequency amplifier 410; the output connection 414 of the amplifier 410 is connected by a conductor 415 to a mixer 420, and particularly to the input terminal 421 therefor; also connected to the mixer 420 is the output from a local oscillator 430 having an output terminal 434 connected by a conductor 435 to a second input terminal 426 for the mixer 420. The resultant IF signal appears at the output 424 of the mixer 420 and is conducted via the conductor 425 to the IF amplifier 440, and particularly the input terminal 441 thereof. The amplified signal appearing at the output terminal 444 of the amplifier 440 is conveyed via a conductor 445 to the input of a limiter 450 and particularly to the input terminal 451 thereof. A first output from the limiter appears on the terminal 454 and is connected by the conductor 455 as an input to the discriminator 460, the conductor 455 being connected to the input terminal 461, and an AC audio output from the discriminator 460 appears at the output terminal 464 that is connected to a conductor 465. The audio signal on the conductor 465 is applied to the audio amplifier 470 and particularly the input terminal 471 thereof, and provided that the tone control circuits to be described hereinafter have operated properly, an output from the audio amplifier 470 appears on a conductor 477 connected to the input terminal 481 of an audio output amplifier 480. The usual output transformer 483 is provided having a primary winding 484 of which one terminal is connected to the output terminal 482 of the amplifier 480 and the other terminal of which is grounded as at 103. The transformer 483 is also provided with a secondary winding 485 which has the terminals thereof connected to conductors 486 and 487 which are connected to a speaker 490 of conventional construction. It will be appreciated that the above describes a typical FM radio receiver of essentially conventional construction.

In accordance with the present invention, circuits are provided to block the output of the audio amplifier 470 until the desired control tone or series of control tones have been received by the receiver 400. To this end a tone control circuit generally designated by the numeral 500 has been provided and includes a tone amplifier 501 having the input thereof connected to the conductor 465 which carries the AC audio output from the discriminator 460. The output of the tone amplifier 501 is connected by the conductor 502 as an input to a prefilter 503 having characteristics such that it will pass all tones in a series of tones designed to actuate the receiver 400. The output of the prefilter 503 is applied by a conductor 505 as an input to a first tone filter 506 adapted to pass the first tone of the sequence of control tones and reject all the other signals, a second tone filter 508 adapted to pass only the second tone in a series of control tones and to reject all the other signals, and a total signal rectifier 510. The output of the first tone filter 506 appearing on the conductor 507 and the output of the total signal rectifier 510 appearing on a conductor 515 are applied as to inputs to a first tone switch 520 having the output thereof appearing on a conductor 525 and utilized as one input to a tone output and clamping circuit 570. The output of the second tone filter 508 appearing on the conductor 509 and the output from the total signal rectifier 510 appearing on the conductor 515 are applied as the inputs to a second tone switch 540 having the output thereof on a conductor 545 applied as a second input to the tone output and clamping circuit 570. The output from the circuit 570 is a control signal appearing on a conductor 650 connected to an input terminal 641 in a squelch-latching circuit 640, the circuit 640 also being connected by a pair of conductors 656 and 657 to proper points in the audio amplifier 470, as will be described more fully hereinafter. The output of the squelch-latching circuit 640 is applied to a conductor 647 as one input to a squelch circuit 660, the output of the squelch circuit 660 being connected by the conductor 670 to the audio amplifier 470.

Another input to the squelch circuit 660 is derived from the conductor 465 which carries the AC audio output from the discriminator 460. Yet another input to the squelch circuit 660 is derived from the noise circuit including a noise amplifier 610 and a noise rectifier 620. The input to the noise amplifier 610 is derived from the conductor 465 and is applied to the input terminal 611 and the output from the amplifier 610 appears on an output terminal 612 which is connected by a conductor 613 to the input terminal 621 of the noise rectifier 620. The output from the noise rectifier 620 appears on the conductor 630 and is another control input to the squelch circuit 660. Another output from the noise rectifier 620 is fed to the limiter 450 and particularly a second output terminal 452 thereof which is connected to the noise rectifier 620 by a conductor 453. Yet another input to the squelch circuit 660 is derived from a switching circuit 700 which has as an input thereto a DC potential derived from the discriminator 460 and obtained from an output terminal 462 thereof and connected to the switching circuit 700 by a conductor 463. The output from the switching circuit 470 is connected to the conductor 647 and is utilized as one of the inputs to the squelch circuits 660. As illustrated, the squelch circuit 660 is operative to render the audio amplifier 470 blocked until the proper concurrence of a signal from the tone control circuit 500 via the squelch-latching circuit 640, a signal from the noise rectifier 620 and a signal from the switching circuit 700.

The receiver 400 of FIG. 4 is also provided with a paging alarm circuit which is connected to the secondary winding 485 of the audio output transformer 483, there being provided an isolating transformer 801 having a primary winding 802 provided with input terminals 804 and 805 connected to the conductors 486 and 487, respectively, and an output winding 803 having one terminal grounded as at 103 and having the other terminal connected by a conductor 808 as an input to a single tone decoder 810. The paging alarm tone is operative when applied to the conductor 810 to provide an output therefrom after the operation of a time delay circuit 840 which is connected to the decoder 810 by the conductors 812 and 818. An output from the decoder 810 appears on a conductor 825 connecting to a switching circuit 850 which when actuated provides a signal on the conductor 875 to operate a paging annunciator 880 such as the lights or the horn of an automotive vehicle.

There further is provided in the receiver 400 a monitor so that the user will have an indication that the channel to which the receiver is tuned is in use without operating switches or other equipment. The monitor circuit is generally designated by the numeral 900 and is connected to the conductor 630 which carries the output from the noise rectifier 620, the conductor 630 being connected as an input to a monitor amplifier 910, the output of the amplifier 910 being connected via a conductor 925 as an input to a monitor switch 930, the output of which in turn is connected by a conductor 945 as an input to a monitor indicator 950.

Figure 5:
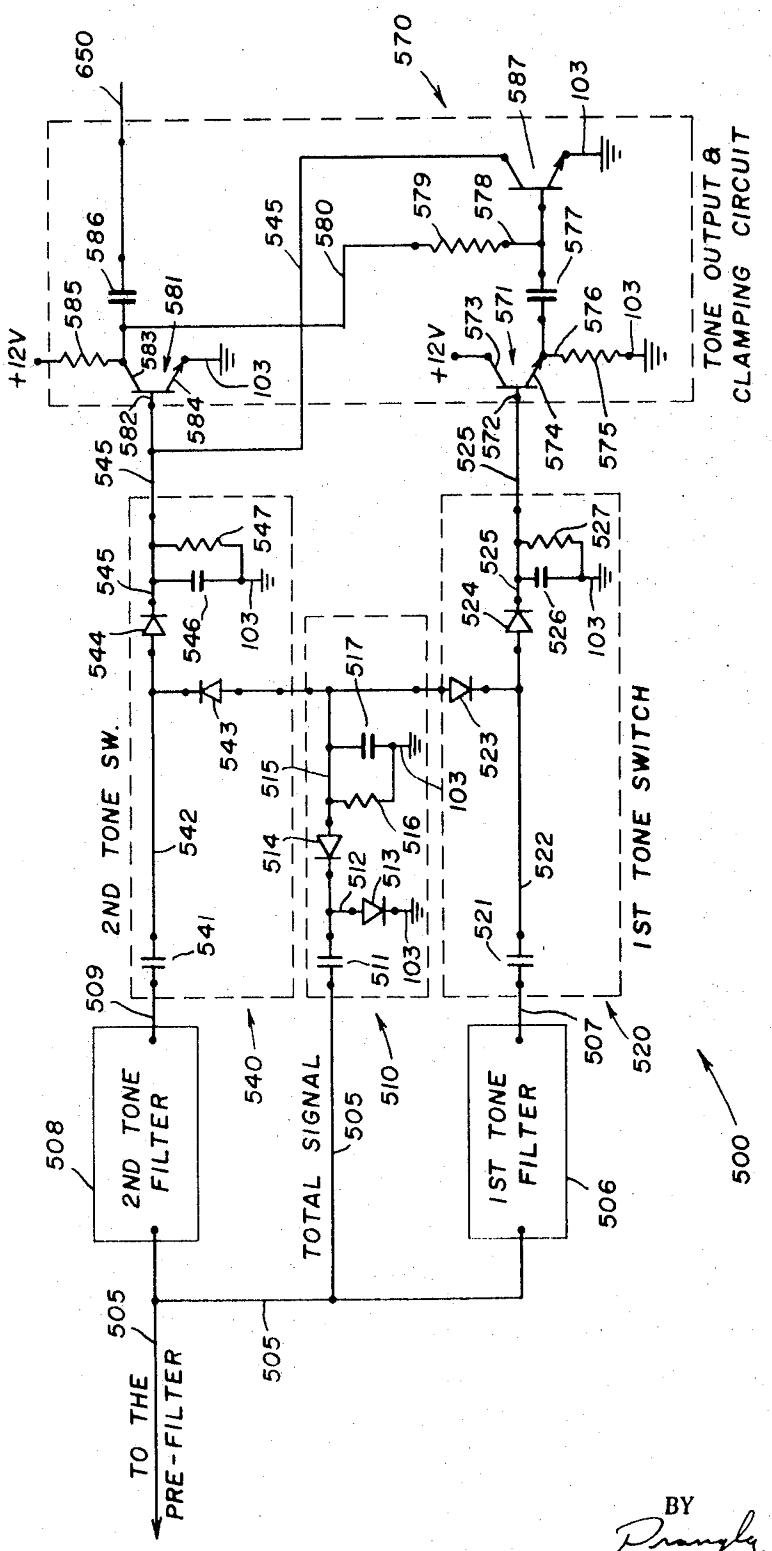
FIG. 5 is an electrical schematic diagram of the tone control circuits for the receiver of FIG. 4 wherein two control tones are used for actuating the receiver.

Referring to FIG. 5 of the drawings, there is illustrated in detail a portion of the tone control circuit 500 and particularly the tone switches 520 and 540, the total signal rectifier 510 and the tone output and clamping circuit 570. The signal appearing on the conductor 505 is an AC audio signal from the prefilter 503 and is applied to one terminal of an input capacitor 511 in the rectifier circuit 510, the other terminal of the capacitor 511 being connected to a conductor 512. A first diode 513 connects the conductor 512 to ground as at 103; the conductor 512 is also connected to one terminal of a second diode 514 which has the other terminal thereof connected to a conductor 515. The conductor 515 is connected to one terminal of an output capacitor 517, the other terminal of the capacitor 517 being grounded as at 103 and a resistor 516 being provided and interconnecting the conductors 515 and 103 and in parallel with the capacitor 517. The circuit 510 rectifies the AC audio signal applied thereto and provides a reference potential on the conductor 515.

The first tone switch 520 has the input thereof connected to the conductor 507 which has applied thereto the output of the first tone filter 506, the conductor 507 more particularly being connected to one terminal of an input capacitor 521 in the switch 520, the other terminal of the capacitor 521 being connected to a conductor 522. The conductor 522 is connected to the conductor 515 by a diode 523 and further is connected to one terminal of an output diode 524, the other terminal of the diode 524 being connected to the output conductor 525. An output capacitor 526 is connected between the conductor 525 and the grounded conductor 103 and a resistor 527 also is connected between the conductors 525 and 103 and in parallel with the output capacitor 526.

The second tone switch 540 has the input thereof connected to the conductor 509 on which appears the output from the second tone filter 508, the conductor 509 being connected to one terminal of the input capacitor 541 which has the other terminal thereof connected to a conductor 542. A connection is made between the conductors 515 and 542 by a diode 543 and the conductor 542 is further connected to one terminal of an output diode 544, the other terminal of the diode 544 being connected to the output conductor 545. An output capacitor 546 interconnects the conductor 545 and the grounded conductor 103 and the resistor 547 is also connected between the conductors 545 and 103 and in parallel with the capacitor 546.

The tone output and clamping circuit 570 has two inputs thereto from the conductors 525 and 545, the conductor 525 being connected to a transistor 571 of the NPN type, and more particularly to the base 572 thereof, the collector 573 thereof being connected to a source of operating potential (for example, +12 volts), and the emitter 574 being connected via a conductor 576 and a resistor 575 to the grounded conductor 103. The conductor 576 is also connected to one terminal of an isolating capacitor 577, the other terminal of the capacitor 577 being connected to a conductor 578. The conductor 578 is connected to the base of a transistor 587 of the NPN type which has the collector thereof connected to the conductor 545 and the emitter thereof connected to the conductor 103. The input conductor 545 from the second tone switch 540 is likewise connected as an input to a transistor 581 and particularly to the base 582 thereof, the collector 583 being connected via a resistor 585 to a source of operating potential (for example, +12 volts), and the emitter 584 thereof is connected to the grounded conductor 103. The collector 583 is further connected by a conductor 580 to one terminal of a resistor 579 which has the other terminal thereof connected to the conductor 578, and the conductor 580 is further connected to one terminal of an output capacitor 586 which has the other terminal thereof connected to the conductor 650 which is an input connection to the squelch-latching circuit 640 to be described in detail hereinafter.

In the operation of the circuits of FIG. 5, when there is only a noise or no input to the circuits on the conductor 505, the transistor 571 is blocked, i.e., is nonconducting, the transistor 587 is heavily conducting and appears as an open circuit between the base 582 of the transistor 581 and ground, whereby the transistor 581 is also blocked, i.e., nonconducting. The rectifier 510 rectifies the entire signal including control tones on the conductor 505 and establishes a reference potential on the conductor 515 proportional to the noise plus the control tones on the conductor 505. Upon the application of the first control tone in a sequence of control tones to the conductor 505, an output is provided from the first tone filter 506 provided that the frequency of the control tone is that to which the filter 506 is adjusted, and accordingly, a signal is applied to the capacitor 521 and when the potential on the conductor 522 exceeds the reference potential on the conductor 515, an output is obtained on the conductor 525 changing the potential thereof, whereby the transistor 571 begins to conduct. Conduction of the transistor 571 begins the charge of the capacitor 577 and the conduction of the transistor 587 actually increases. Immediately upon the removal of the first control tone from the conductor 505, the transistor 571 becomes blocked and the transistor 587 is likewise blocked during the discharge of the capacitor 577, the discharge of the capacitor 577 due to the interruption of conduction of the transistor 571 resulting in a negative pulse overriding the positive voltage applied to the base of the transistor 587 through the resistor 579.

In accordance with the present invention, as soon as the first tone of the sequence of tones is interrupted, the second control tone is applied from the conductor 505 through the filter 508 and to the input of the second tone switch 540, and when the signal on the conductor 542 becomes greater than the bias on the conductor 515, an output is obtained on the conductor 545 which is applied to the transistor 581. If the transistor 587 is still substantially blocked because of the interruption of the first tone as described above, then the signal from the second tone appearing on the conductor 545 will cause conduction of the transistor 581; it is noted that if no first tone has been received or if the first tone has not yet been interrupted, whereby the transistor 587 is still heavily conducting, then the transistor 581 will remain blocked even though a suitable control signal from the second tone switch 509 is applied to the conductor 545. At the end or termination of the second control tone to the second tone switch 540, the signal on the conductor 545 will be removed thus blocking the transistor 581 and permitting the capacitor 586 which has heretofore been partially charged during the conduction of the transistor 581 to discharge thus providing a positive pulse as an output on the conductor 650.

Figure 6:
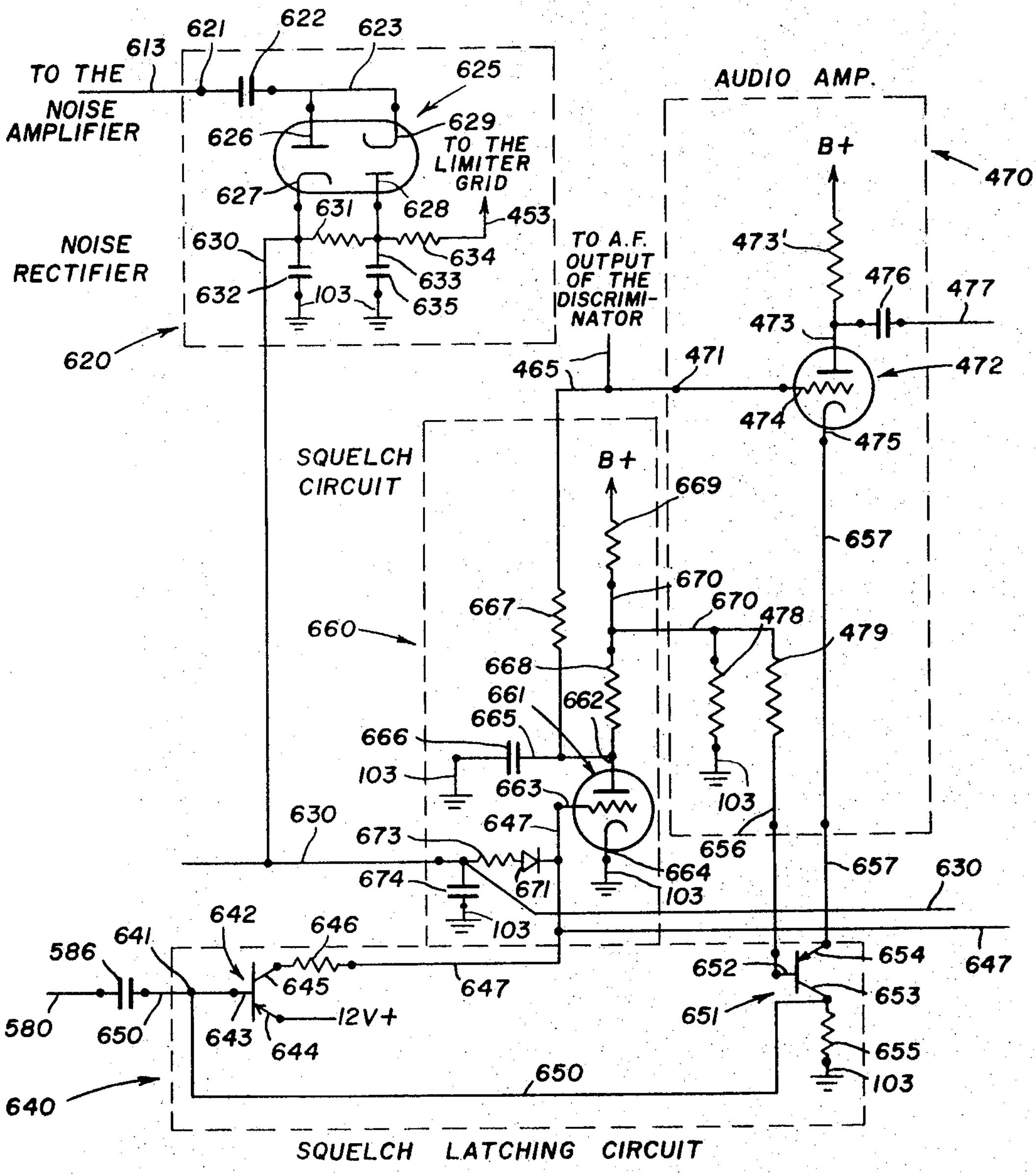
FIG. 6 is a schematic electrical diagram of the squelch circuit, the squelch-latching circuit, the noise rectifier and the first audio-amplifying circuit of the receiver illustrated in FIG. 4.

The positive pulse which is the output from the circuit 570 on the conductor 650 is applied to the squelch-latching circuit, the details of which are best illustrated in FIG. 6 of the drawings. More specifically, the conductor 650 is connected to the input 641 of the circuit 640 and further is connected to one terminal of a resistor 655 which has the other terminal thereof grounded as at 103. The conductor 650 further is connected to a transistor 642 of the PNP type, and particularly to the base 643 thereof, the emitter 644 thereof being connected to a source of operating potential (for example +12 volts), and the collector 645 thereof being connected to one terminal of a resistor 646 having the other terminal thereof connected to the conductor 647. The conductor 650 further is connected to a transistor 651 of the PNP type, and more specifically to the collector 653 thereof, the base thereof being connected to the conductor 656 and the emitter 654 thereof being connected to the conductor 657.

The conductor 647 is connected as one of the inputs to the squelch circuit 660 and particularly to the squelch tube 661, and specifically the control grid 663 thereof. The cathode 664 of the squelch tube 661 is grounded via the conductor 103 and the anode 662 of the squelch tube 661 is connected via a conductor 655, a resistor 668, a conductor 670 and a resistor 669 to a source of $B^+$ operating potential. There further is provided in the anode circuit of the squelch tube 661 a resistor 667 interconnecting the conductor 665 and the conductor 465 which carries the AC audio output from the discriminator 460, and there further is provided a capacitor 666 interconnected between the conductor 665 and the grounded conductor 103. There also is provided in the control grid circuit of the squelch tube 661 an isolating diode 671 having one terminal thereof connected to the conductor 647 and having the other terminal thereof connected to one terminal of a resistor 673, the other terminal of the resistor 673 being connected to the conductor 630. The conductor 630 is also connected to one terminal of the capacitor 674 which has the other terminal thereof connected to the grounded conductor 103, and the conductor 630 also is connected to the output of the noise rectifier 620.

The noise rectifier 620 has an input terminal 621 thereof connected to the conductor 613 to which is applied the output from the noise amplifier 610, namely, the high-frequency AC audio signal from the discriminator 460 amplified through the noise amplifier 610. An input capacitor 622 is provided having one terminal thereof connected to the input terminal 621 and having the other terminal thereof connected to the conductor 623. The noise rectifier 620 includes a dual diode 650 having a first anode 626 and a first cathode 629 connected to each other and to the conductor 623, and having a second anode 628 and a second cathode 627, the cathode 627 being connected to the output conductor 630. A filtering capacitor 632 connects the conductor 630 to the grounded conductor 103 and a filtering capacitor 635 interconnects the anode 628 via a conductor 633 to the grounded conductor 103. There further is provided a resistor 631 interconnecting the conductors 630 and 633 and a resistor 634 interconnecting the conductor 633 and the conductor 453, the conductor 453 being connected to the grid of the limiter 450 in the usual manner.

The audio amplifier 470 comprises a triode 472 having an anode 473 connected by a limiting resistor 473′ to the $B^+$ voltage supply, a control grid 474 connected to the input terminal 471 which is in turn connected to the conductor 465 to which is applied the AC audio output from the discriminator 460, and a cathode connected to the conductor 657. There further is provided in the cathode circuit a resistor 479 connected between the conductors 656 and 670 and a resistor 478 connected between the conductor 670 and the grounded conductor 103. The output from the amplifying tube 472 is from the anode 473 to which is connected one terminal of a capacitor 476, the other terminal of the capacitor 476 being connected to the conductor 477 which is connected as the input to the audio output amplifier 480.

In the circuits of FIG. 6, the squelch tube 661 operates in the absence of a carrier signal in the input to the receiver 400 resulting in a high potential from the noise rectifier 620 to the grid 663 thereof so that it is heavily conducting, thus to provide a low potential at the plate 662 and thus a low potential on the grid 474 of the audio-amplifying tube 472, thus preventing any output therefrom. Upon the application of the proper carrier signal to the receiver 400, the various circuits between the antenna and the noise rectifier 620 operate so that substantially no potential is applied on the conductor 630 which is in turn applied to the control grid 663 of the squelch tube 661 which tends to cut off or decrease the conduction therethrough so as to raise the potential on the control grid of the audio-amplifier tube 472, thus to permit an audio output therefrom. In accordance with the present invention, however, the signal from the noise rectifier 620 on the conductor 630 by itself is not sufficient to operate the squelch tube 661 so as to permit an output from the audio-amplifying tube 472; more specifically, the squelch tube 661 remains in a first operating condition wherein it renders the audio amplifier 470 blocked or inoperative, and the application of a signal removing the high bias to the control grid 663 from the noise rectifier 620 along the conductor 630 is not sufficient by itself to actuate the squelch tube 661 into the second condition thereof wherein the audio amplifier 470 is operative. It is necessary further, in accordance with the present invention, to apply a tone control signal from the tone control circuit 500; more specifically, the positive going pulse through the capacitor 586 which has been described above. Before the application of the positive going pulse through the capacitor 586 to the conductor 650, the transistor 642 is conducting which serves to hold the squelch tube 661 in the heavily conducting condition thereof, thereby to prevent operation of the audio amplifier 470. Upon the removal of the second control tone from the transmission applied to the receiver 400, the positive pulse is applied via the capacitor 586 to the conductor 650 due to the discharge of the capacitor 586 and the positive pulse momentarily blocks the transistor 642 and thus removes one of the high operating potentials from the control grid 663 of the squelch tube 661 and places the squelch tube 661 under the control of the noise rectifier 620. If the carrier signal is present from the noise rectifier 620, the squelch tube 661 will decrease in the conduction thereof and thus raise the potential of the control grid of the audio-amplifier tube 472 and permit conduction therethrough and transmittal of the AC audio signal from the conductor 465 to the output conductor 477.

Conduction of the tube 472 will cause conduction through the transistor 651 which causes a positive voltage to be fed therefrom back to the base 643 of the transistor 642 thus to maintain the transistor 642 in the blocked or nonconducting condition thereof and thus to remove and effectively disconnect the squelch tube 661 from the control of the tone control circuit 500 and to place the operation of the squelch circuit 660 solely under the control of the noise rectifier 620, whereby the audio amplifier 470 will remain operative so long as the carrier signal is applied to the receiver 400.

The potential developed across the resistor 655 during the conduction of the audio-amplifying tube 472 further serves to charge the capacitor 586 to a potential which will serve to hold the transistor 642 in the blocked or nonconducting condition thereof for a short time after the tube 472 ceases to conduct, and more specifically, until the capacitor 586 can again discharge through the resistor 655. In other words, the capacitor 586 and the resistor 655 provide a time delay circuit which prevents the tone control circuit 500 from again assuming control of the squelch circuit 660 because of momentary loss of the carrier signal and thus the input from the noise rectifier 620 to the squelch circuit 660 on the conductor 630 retains control for the delay period; the circuit values for the capacitor 586 and the resistor 655 can be chosen to provide a time delay of the order of 0.3 second to 0.5 second or more.

In a typical example of the tone control circuit 500, the various components thereof would have the following values: capacitor 511, 0.02 $\mu$f.; resistor 516, 1 megohm; capacitor 517, 0.02 $\mu$f.; capacitor 521, 820 $\mu\mu$f.; capacitor 526; 0.01 $\mu$f.; resistor 527, 1 megohm; capacitor 541, 820 $\mu\mu$f.; capacitor 546, 0.01 $\mu$f.; resistor 547, 1 megohm; resistor 575, 470,000 ohms; capacitor 577, 0.01 $\mu$f.; resistor 579, 22 megohms; resistor 585, 1 megohm; capacitor 586; 0.02 $\mu$f.; resistor 646, 1.2 megohms; resistor 655, 6.8 megohms.

Figure 5A:
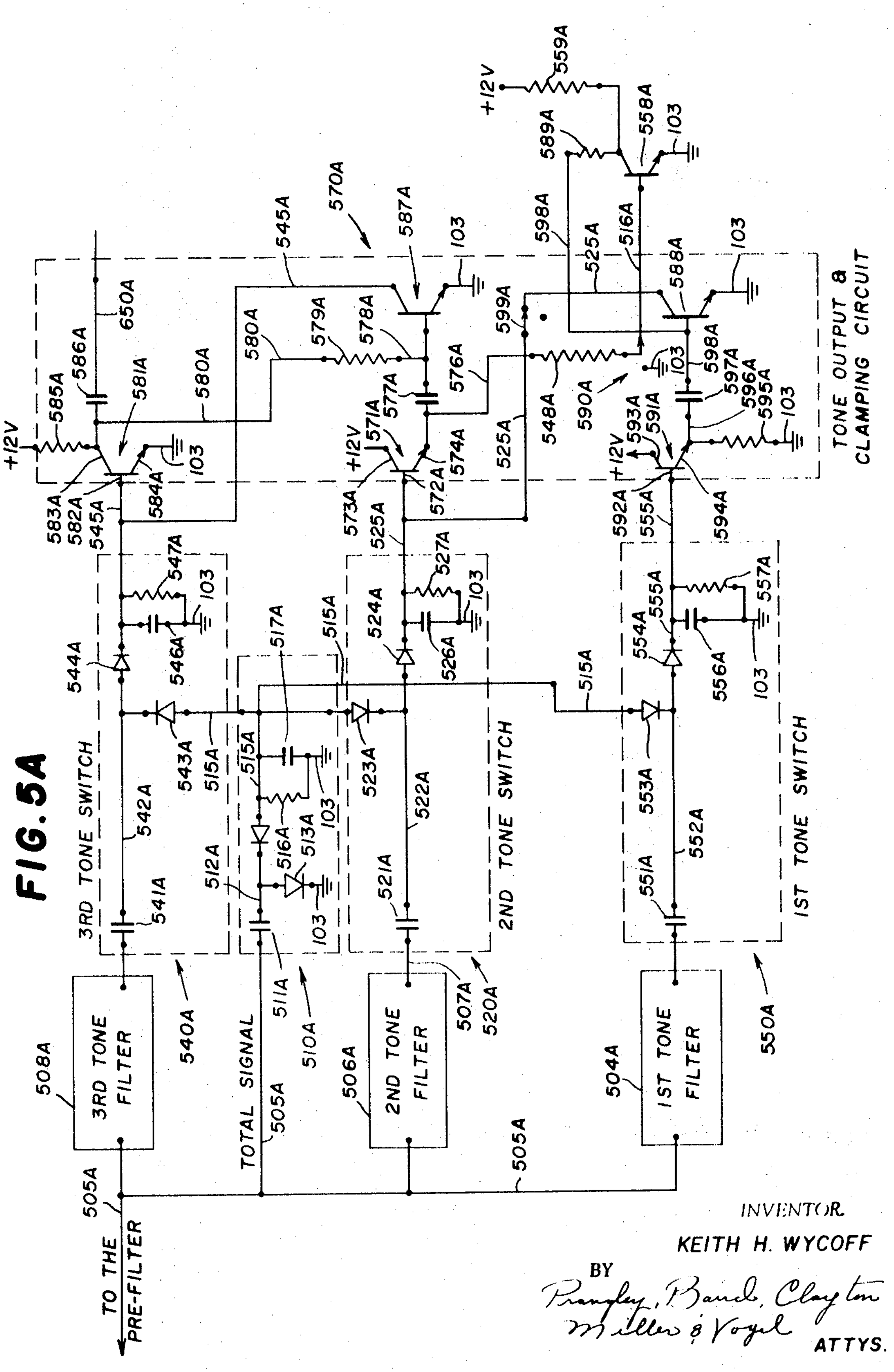
FIG. 5A is a schematic electrical diagram similar to FIG. 5 illustrating the tone control circuits for a receiver wherein three control tones are used for actuating the receiver.

There is shown in FIG. 5A of the drawings a modification of the tone filters, the tone-switching circuits and the tone output and clamping circuit illustrated in FIG. 5, the circuits of FIG. 5A being adapted and arranged to operate when the selective calling-control tones is either a series of two control tones or a series of three control tones. Where appropriate like numerals have been used in FIG. 5A for like parts in FIG. 5 with the addition thereto of the suffix "A," whereby it will be seen that the input conductor 505A corresponds to the input conductor 505, the second tone filter 506A corresponds to the first tone filter 506, the third tone filter 508A corresponds to the second tone filter 508, the total signal rectifying circuit 510A corresponds to the circuit 510, the second tone switch 520A corresponds to the first tone switch 520, and the third tone switch 540A corresponds to the second tone switch 540. Further in the tone output and clamping circuit 570A, those parts disposed above the switches 590A and 599A and including the circuits for the transistors 571A and 581A and 587A correspond to the like circuit elements in the circuits for the transistors 571 and 581 and 587, respectively, in FIG. 5; and in fact when the switch 599A is operated so that its movable contact is open breaking the conductor 525A and when the switch 590A is operated so that the movable contact thereof is connected to the grounded conductor 103, the tone operating and clamping circuit of 570A is identical in construction and operation to the tone output and clamping circuit 570 of FIG. 5.

When the switches 590A and 599A are placed in the position illustrated in FIG. 5A, and particularly when the movable contact of switch 590A is in connection with the conductor 516A, and switch 599A is closed, the circuits of FIG. 5A are in condition so that they will be actuated only by a predetermined sequence of three control tones, and more particularly, additional circuits are connected. Another tone filter 504A is provided which in fact becomes the first tone filter and is adjusted and arranged to be responsive only to the first selected tone in the series of control tones and serves to provide in the output thereof a signal only when the proper control tone is applied as an input thereto from the conductor 505A. The output of the first tone filter 504A is connected to the first tone switch 550A and particularly to one terminal of an input capacitor 551A, the other terminal of the capacitor 551A being connected to the conductor 552A. The conductor 552A is connected to the reference potential conductor 515A through a diode 553A, and is connected to the output of the conductor 555A through a second diode 554A. The output conductor 555A is provided with an output capacitor 556A connected to the grounded conductor 103 and a resistor 557A interconnects the conductors 555A and 103 in parallel with the output capacitor 556A.

The conductor 555A connects with the tone output and clamping circuit 570A and more particularly is connected to the base 592A of a transistor 591A, the collector 593A thereof being connected to an operating potential (for example, +12 volts), and the emitter 594A thereof is connected to a conductor 597A. The conductor 596A has one connection to one terminal of a resistor 595A which has the other terminal thereof grounded as of 103, and another connection to one terminal of a capacitor 597A which has the other terminal thereof connected to the conductor 598A. The conductor 598A connects the output of the transistor 591A to the base of a transistor 588A, the collector thereof being connected to the conductor 525A and the emitter thereof being grounded as at 103. The conductor 598A further connects to a second transistor 558A which serves to clamp the transistor 588A in the off condition when the transistor 571A is conducting, and more particularly the conductor 598A is connected to one terminal of a resistor 589A which has the other terminal thereof connected to the collector of the transistor 558A. The collector of the transistor 558A is further connected through a limiting resistor 559A to a source of operating potential (for example, +12 volts), the emitter of the transistor 558A is grounded as at 103, and the base of the transistor 558A is connected to a conductor 516A which serves to supply current from the transistor 571A and the capacitor 577A which are a part of the output circuit associated with the second tone switch 520A, thereby controlling the voltage applied to the base of transistor 558A. More specifically, when the switches 590A and 599A are in the position illustrated in FIG. 5A, the conductor 516A is connected thereby to one terminal of the resistor 548A which has the other terminal thereof connected by the conductor 576A to the transistor 571A, and more particularly the emitter 574A thereof, and the emitter of the transistor 588A is connected to the base of the transistor 571A.

In the operation of the tone control circuit of FIG. 5A, the series of control tones received by the transmitter 400 is applied thereto via the conductor 505A and the total signal is applied to the rectifier circuit 510A which quickly establishes a reference potential on the conductor 515A proportional to the total signal. If the total signal includes the first tone to which the filter 504A is tuned, the first tone will be applied to the first tone switch 550A and as soon as the value thereof exceeds the reference potential in the conductor 515A, an output will be obtained on the conductor 555A. Prior to the reception of a signal on the conductor 555A, the transistor 591A is blocked and the transistor 588A is conducting and appears as an open circuit between the base of the transistor 571A and ground. Upon the application of the first control tone signal along the conductor 555A to the transistor 591A, the transistor 591A begins to conduct and to charge the capacitor 597A, the transistor 588A also conducting harder during the charge of the capacitor 597A. Upon the interruption of the first control tone with the concurrent removal of a signal from the conductor 555A, the transistor 591A again becomes blocked and the capacitor 597A discharges which results in a negative pulse momentarily blocking the transistor 588A. This removes the short circuit on the base of 572A of the transistor 571A. The transistor 571A now conducts if the second tone in the series of control tones produces a signal on the conductor 525A, and this conduction of the transistor 571A charges the capacitor 577A, and also causes the current to flow via the conductor 578A through the resistor 548A to the conductor 518A to the base of the transistor 558A so that it saturates, effectively grounding its collector thereby grounding the resistors 559A and 589A at their common connection and thereby removing the plus potential previously applied via the resistor 589A to the base of the transistor 588A via the conductor 598A so that the transistor 588A is blocked for the duration of the second tone. This removes the short from the base 572A of the transistor 571A for the duration of said tone. The transistor 587A which has been heretofore conducting will conduct even harder during the charging of the capacitor 577A and as a result the transistor 581A will continue to have its input shorted to ground. At the end of the second control tone the signal produced thereby will be removed from the conductor 525A thus blocking the transistor 571A and the discharge of the capacitor 577A will momentarily hold transistor 558 in conduction and provide a negative pulse which is applied to the transistor 587A which will block the transistor 587A and allow conduction of the transistor 581A provided that the appearance of the third tone on the conductor 505A results in a corresponding signal on the conductor 545A also applied to the transistor 581A, the conduction of the transistor 581A serving to discharge the capacitor 586A. When the third tone ends, the corresponding signal on the conductor 545A will be removed thus blocking the transistor 581A and causing the capacitor 586A to charge. The charge of the capacitor 586A will result in a positive pulse on the conductor 650A which is applied as an input to the squelch-latching circuit 640, and particularly to the base of the transistor 642 as has been described above with respect to FIG. 6. The application of the positive pulse along the conductor 650 to the transistor 642 briefly blocks the transistor 642, as has been explained above, which action permits the squelch tube 661 to be controlled by the output of the noise rectifier 620 appearing on the conductor 630 and also applied to the control grid 663 of the squelch tube 661.

In the typical operating example of the circuit of FIG. 5A, the circuit components of the circuits 510A, 520A, 540A and 570A above the switch 590A may have the same values as those with the correspondingly numbered circuit components in FIG. 5. In the tone switch 550A, the capacitor 551A may have a value of 820 $\mu\mu$f., the capacitor 556A has a value of 0.01 $\mu$f., the resistor 557A has a value of 1 megohm. In that portion of the tone output and clamping circuit below the switch 590A, the resistor 595A has a value of 470,000 ohms, the capacitor 597A has a value of 0.01 $\mu$f., the resistor 589A has a value of 22,000 ohms, and the resistor 559A has a value of 3.9 megohms.

Figure 6A:
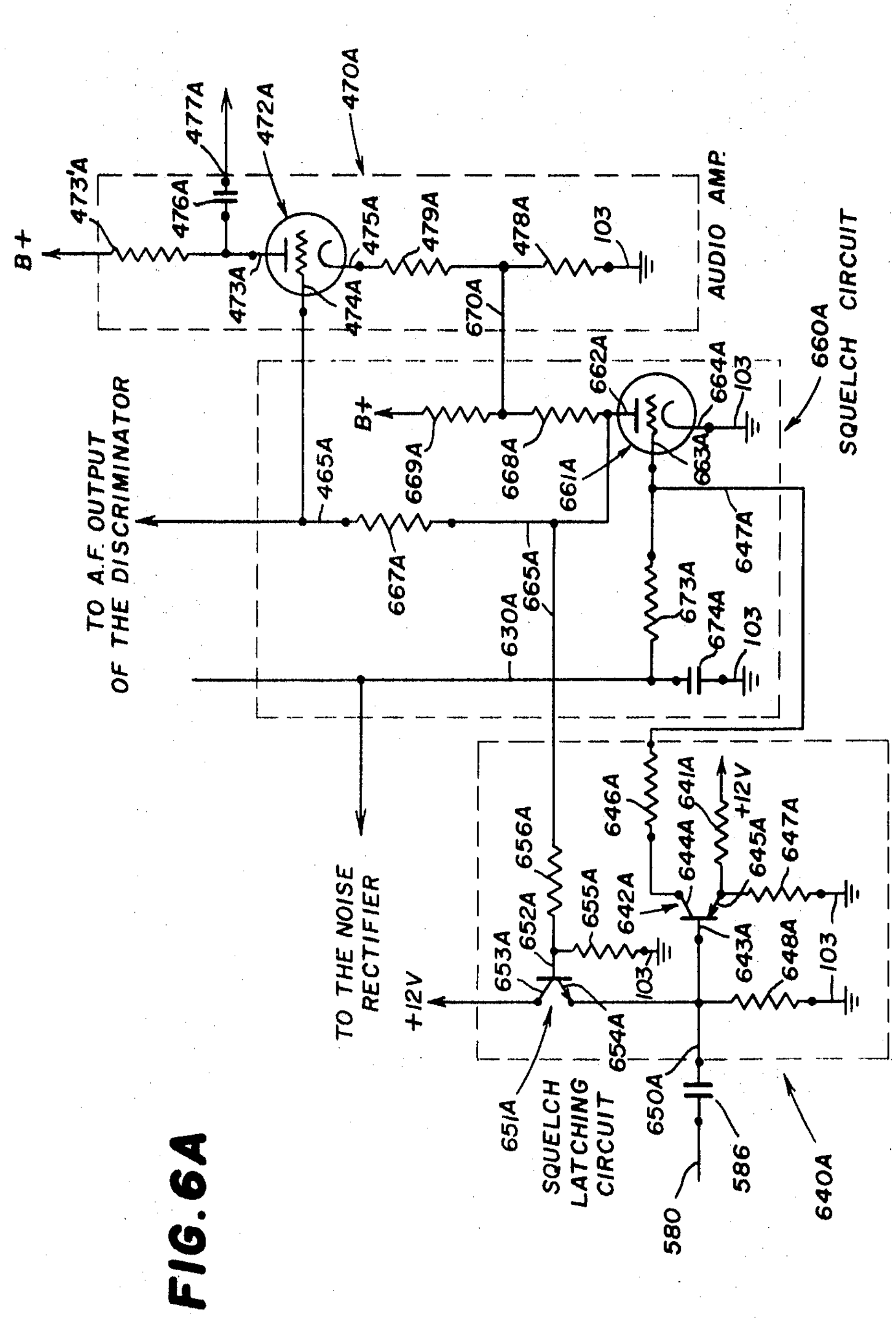
FIG. 6A is a schematic electrical diagram similar to FIG. 6 illustrating a modification thereof.

There is shown in FIG. 6A of the drawings a modification of the portions of the tone control circuit and the squelch circuit which are illustrated in FIG. 6, and particularly modifications in the squelch-latching circuit 640A, the squelch circuit 660A and the audio-amplifier circuit 470A. The output of the preceding stages of the tone control circuit 500 in the form of a positive pulse from the discharge from the capacitor 586 or 586A described above is applied to the conductor 650A which is connected directly to a transistor 642A of the PNP type, and particularly to the base 643A thereof. The transistor 642A further has the collector 644A thereof connected to one terminal of the resistor 646A which has the other terminal thereof connected by a conductor 647A to the control grid of the squelch tube 661A. The emitter 645A of the transistor 642A is connected to the grounded conductor 103 through a resistor 647A and is connected to a source of operating potential (for example, +12 volts) through a resistor 641A. The base 643A of the transistor 642A is further connected by the conductor 650A to the grounded conductor 103 through a resistor 648A and to a transistor 651A of the NPN type. The transistor 651A more specifically has the emitter 654A connected to the conductor 650A and has the collector 653A thereof connected to a source of operating potential (for example, +12 volts), and has the base 652 thereof connected first to the grounded conductor 103 through a resistor 655A and secondly through a resistor 656A to a conductor 665A connected to the anode of the squelch tube 661A.

The squelch tube 661A as illustrated is a triode having the anode 662A thereof connected through a pair of series resistors 668A and 669A to $B^+$ and having the cathode 664A thereof grounded as at 103, and having the control grid 663A thereof connected to the conductor 647A. The conductor 647A in addition to connecting to the squelch-latching circuit 640A as described above is connected through a resistor 673A to a conductor 630A which is connected to the output of the noise rectifier 620 and which is also connected through a capacitor 674A to the grounded conductor 103. As has been explained above, the anode 662A of the squelch tube 661A is connected via the conductor 665A to the squelch-latching circuit 640A and further is connected through a resistor 667A to a conductor 465A, the conductor 465A being connected to the AC audio output of the discriminator 460.

The audio amplifier 470A comprises a triode 472A having an anode 473A, a control grid 474A and a cathode 475A. The anode 473A is connected through a limiting resistor 473'A to a source of $B^+$ operating potential and is connected through a capacitor 476A to an output conductor 477A which is adapted to be connected as the input to the audio output amplifier 480 (see FIG. 4). The control grid 474A is connected to the conductor 465A to have applied thereto the AC audio output from the discriminator 460 and the squelch control signals from the squelch circuit 660A. The cathode 475A is connected through the series resistors 479A and 478A to the grounded conductor 103, and the junction between the resistors 478A and 479A is connected by a conductor 670A to the junction between the resistors 668A and 669A in the anode circuit of the squelch tube 661A.

In the operation of the circuits of FIG. 6A, upon the application of the proper series of control tones to the tone control circuit 500, a positive going pulse is applied through the capacitor 586 to the conductor 650A; before such time the transistor 642A is conducting thereby holding the squelch tube 661A in heavy conduction to block the audio-amplifying tube 472A, and the transistor 651A is blocked. The positive going pulse on the conductor 650A briefly blocks the transistor 642A since the positive pulse overrides the negative voltage between the base 643A and the emitter 645A applied thereto through the resistor 648A. As a consequence of the blocking of the transistor 642A, the squelch tube 661A is placed under the control of the noise rectifier, whereby if the on-channel signal derived from the carrier applied to the receiver 400 is now present on the conductor 630A, the squelch tube 661A is biased to render it less conductive thus to raise the potential on the control grid of the amplifying tube 472A so as to permit operation thereof and passage of the audio signal to the audio output amplifier 480 (see FIG. 4). Also transistor 651A is biased into conduction thereby holding the transistor 642A blocked.

Thereafter the squelch tube 661A is under the control of the output of the noise rectifier 620 appearing on the conductor 630A and an audio output will be retained in the receiver so long as the carrier signal is received to provide a signal on the conductor 630A. A momentary loss of the carrier signal will not cause conduction of the transistor 642A until the capacitor 586 can discharge, which time can be adjusted to as much as 0.3 second to 0.5 second. Accordingly, the circuit is locked or latched in a condition to permit audio output for a short period of time after loss of the carrier and the resultant signal on the conductor 630A, thus to prevent dropout due to short interruptions of the carrier signal.

In an illustrative example, the circuit elements of the squelch-latching circuit 640A will be as follows: resistor 648A, 5.6 megohms; resistor 647A, 100,000 ohms; resistor 641A, 47,000 ohms; resistor 655A, 10 megohms; resistor 656A, 22 megohms; and resistor 646A, 1.2 megohms.

Figure 7:
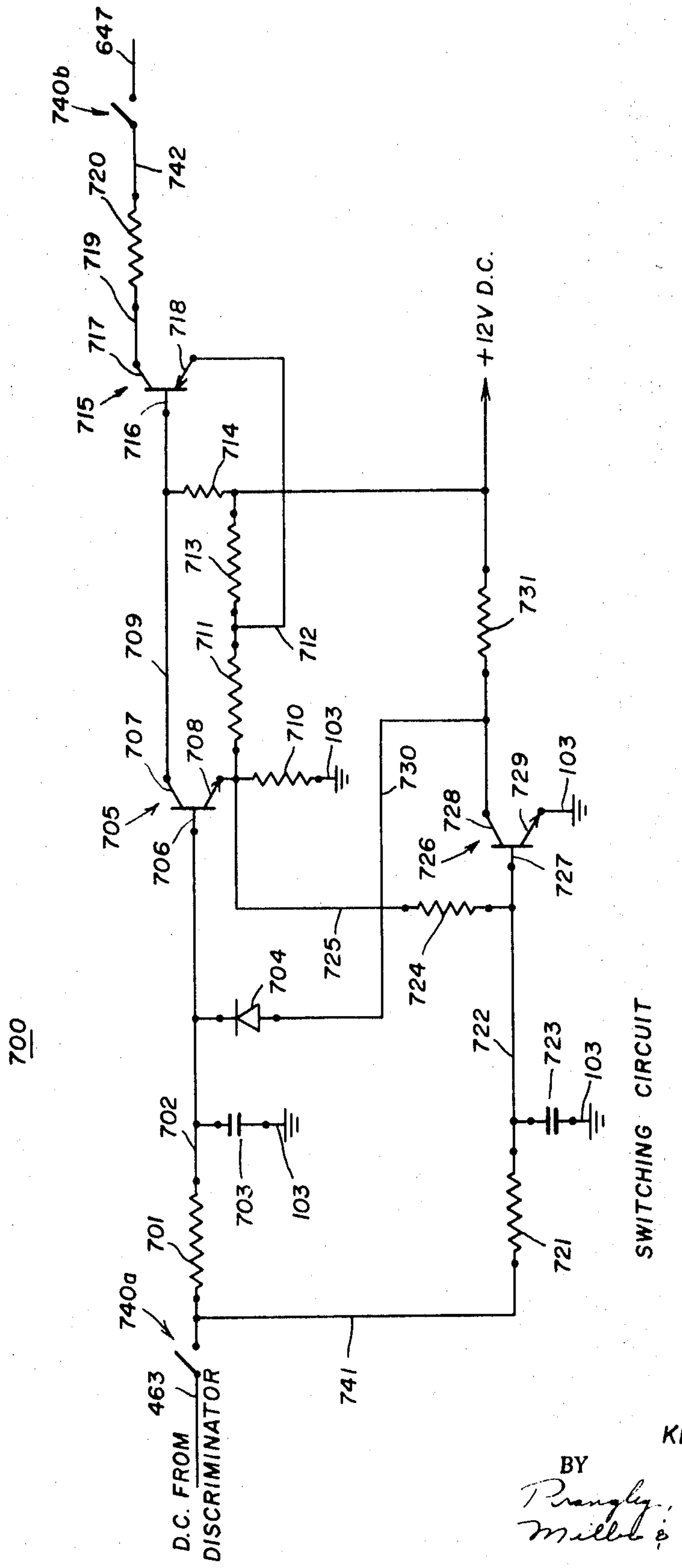
FIG. 7 is a schematic electrical diagram of a switching circuit forming a part of the receiver of FIG. 4.

The details of the switching circuit 700 are illustrated in FIG. 7 of the drawings, the switching circuit 700 operating to interrupt the audio output of the receiver 400 through operation of the squelch circuit 660 to prevent actuation of the receiver 400 by strong transmission on channels adjacent to that on which the receiver 400 is tuned to operate. The input to the switching circuit 700 is a DC voltage from the discriminator 460 (see FIG. 4) on the conductor 463, the potential on the conductor 463 being essentially zero when the carrier signal applied to the receiver 400 is that for which the receiver is tuned, and the DC potential on the conductor 463 rising to about 6 volts when a carrier signal is received that is approximately 7 kilocycles away from the carrier signal for which the receiver 400 is tuned.

In accordance with the present invention, the switching circuit 700 may be put in or removed as desired and to this end a switch 740 is provided having a first switch section 740*a* in the conductor 463 and a second switch section 740*b* adapted to connect to the conductor 647 that is connected to the control grid of the squelch tube 661, (see FIG. 6). The switch section 740*a* more particularly connects to an input conductor 741 which is connected to one terminal of a first resistor 701 which has the other terminal thereof connected to a conductor 702, and connects to one terminal of a second resistor 721 having the other terminal thereof connected to a conductor 722. The conductor 702 is connected to the grounded conductor 103 through a capacitor 703 and also connects to a transistor 705 of the NPN type and particularly to the base 706 thereof. The collector 707 of the transistor 705 is connected to a conductor 709 and the emitter 708 is connected to the grounded conductor 103 through a resistor 710.

The conductor 722 is connected to the emitter 708 of the transistor 705 through a resistor 724 and a conductor 725, and is also connected as an input to a transistor 726 of the NPN type and particularly the base 727 thereof. The emitter 729 of the transistor 726 is connected to the grounded conductor 103 and the collector 728 is connected to a conductor 730 which in turn is connected through a limiting resistor 731 to a source of operating potential (for example, +12 volts). A diode 704 is provided interconnecting the conductor 702 and 730 and more particularly interconnects the base 706 of the transistor 705 and the collector 728 of the transistor 726. The source of operating potential is also connected to one terminal of a resistor 714 which has the other terminal thereof connected by the conductor 709 to the collector 707 of the transistor 705, and also is connected to one terminal of a resistor 713 having the other terminal thereof connected by a conductor 712 to one terminal of a resistor 711 which has the other terminal thereof connected by the conductor 725 to the emitter 708 of the transistor 705. The conductor 709 also connects the collector 707 of the transistor 705 to another transistor 715 of the PNP type, and particularly to the base 716 thereof. The emitter 718 of the transistor 715 is connected by the conductor 712 to the junction of the resistors 711 and 713, and the collector 717 of the transistor 715 is connected by a conductor 719 to one terminal of a resistor 720 which has the other terminal thereof connected by a conductor 742 to the switch 740*b* that connects when closed to the output conductor 647 in communication with the control grid of the squelch tube 661 (see FIG. 6).

In the operation of the switching circuit 700 when the switch section 740*a* and 740*b* are closed, there is no output therefrom on the conductor 647 when the carrier signal applied to the receiver 400 is that for which it is tuned since the DC voltage from the discriminator on the conductor 463 will be essentially zero. Once an on-frequency carrier signal is received by the transmitter 400, the DC output from the discriminator 460 will remain substantially zero and will not rise above 6 volts in the usual receiver even though the frequency of the carrier signal drifts up to as much as 7 kilocycles of the frequency to which the receiver is tuned.

However, if the receiver 400 is not receiving an on-frequency signal, and there is applied thereto a strong signal from an adjacent channel which might tend to operate the receiver 400, the DC voltage from the discriminator 460 applied along the conductor 463 will exceed 6 volts. The application of such a potential at the input of the switching circuit 700 causes a positive output to be applied thereby to the conductor 647 connected to the control grid of the squelch tube 661, and accordingly, the squelch tube 661 conducts heavily and holds the audio-amplifying tube 472 in a nonoperating condition, thus to block the audio output from the receiver 400.

Figures 8, 9:
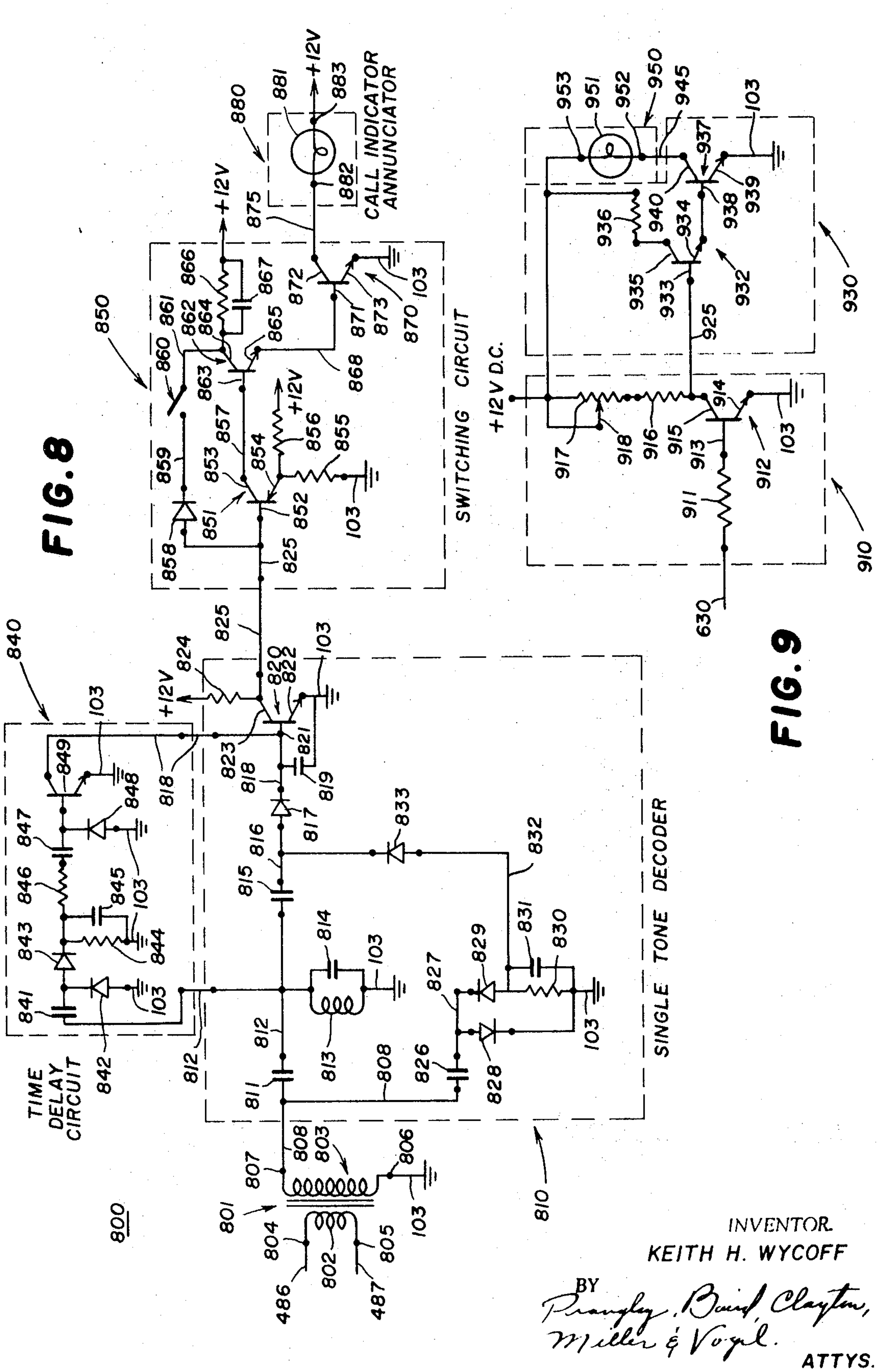
FIG. 8 is a schematic electrical diagram of the call indicator circuit forming a part of the receiver of FIG. 4.
FIG. 9 is a schematic electrical diagram of the monitoring circuit forming a part of the receiver of FIG. 4.

The call-indicator system is generally designated by the numeral 800 and the details thereof are illustrated in FIG. 8 of the drawings. The input to the circuit 800 is from the conductors 486 and 487 connected to the terminals of the audio output transformer 483 (see FIG. 4), which input is applied to a step-up transformer 801 and particularly to the primary winding 802 thereof at the terminals 804 and 805, respectively. The transformer 801 has a secondary winding 803 provided with one terminal 806 that is connected to the grounded conductor 103 and a second terminal 807 connected to a conductor 808 which provides an input to the single tone-decoder 810.

The tone-decoder 810 comprises a tone filter network including an input capacitor 811 having one terminal thereof connected to the conductor 808 and having the other terminal thereof connected to a conductor 812, the conductor 812 connecting to a filter circuit including an inductor 813 and a capacitor 814 arranged in parallel circuit and having one of the common terminals thereof connected to the conductor 812 and having the other common terminals thereof connected to the grounded terminal 103. The conductor 812 connects with one terminal of an output capacitor 815 which has the other terminal thereof connected to a conductor 816. The decoder 810 further comprises a total signal rectifying circuit including an input capacitor 826 having one terminal thereof connected to the input terminal 808 and having the other terminal thereof connected to a conductor 827. A first diode rectifier 828 is provided having one terminal thereof connected to the conductor 827 and the other terminal thereof connected to the grounded conductor 103, and a second diode rectifier 829 is provided having one terminal thereof connected to the conductor 827 and the other terminal thereof connected through a conductor 832 and a resistor 830 to the grounded conductor 103, the diodes 828 and 829 being oppositely poled. A filtering capacitor 831 is connected between the conductor 832 and the grounded conductor 103. A rectified and filtered DC potential is provided on the conductor 832 that is proportional to the total signal received on the conductor 808 and serves as a reference voltage.

A diode 833 interconnects the conductors 816 and 832, and the conductor 816 further is connected to one terminal of an output diode 817 which has the other terminal thereof connected by a conductor 818 to an output transistor 820 of the NPN type, and more particularly to the base 821 thereof. The emitter 822 of the transistor 820 is connected to the grounded conductor 103 and a capacitor 819 is also provided interconnecting the conductor 818 and the grounded conductor 103. The collector of the transistor 820 is connected through a conductor 825 and a limiting resistor 824 to a source of operating potential (for example, +12 volts). The output of the decoder 810 appears on the conductor 825 and is connected to the switching circuit 815.

A time delay circuit 840 is provided to insure that the tone being decoded at the circuit 810 has the proper time duration, the time delay circuit being connected between the conductors 812 and 818. More specifically, the conductor 812 is connected to one terminal of an input capacitor 841 which as the other terminal thereof is connected to one terminal of a first diode 842 having the other terminal thereof connected to the grounded conductor 103 and is connected to one terminal of a second diode 843 which has the other terminal thereof connected to one terminal of a resistor 844 and one terminal of a capacitor 845, the other terminals of the resistor 844 and the capacitor 845 being connected to the grounded terminal 103. The common junction between the diodes 843, the resistor 844 and the capacitor 845 is connected to one terminal of a resistor 846 which has the other terminal thereof connected to one terminal of a capacitor 847, the other terminal of the capacitor 847 being connected first to one terminal of a diode 848 having the other terminal thereof connected to the grounded conductor 103, and secondly being connected to the base of a transistor 849 of the NPN type. The emitter of the transistor 849 is connected to the grounded conductor 103 and the collector of the transistor 849 is connected to the conductor 818. The time delay circuit 840 operates to ground the input to the transistor 820 appearing on the conductor 818 until the expiration of the desired time delay period, at which time the transistor 849 operates and appears as an open circuit thus placing the operation of the transistor 820 under the control of the output from the tone filter circuits, if any, appearing on the conductor 818.

The switching circuit 850 has as an input thereto the signal appearing on the conductor 825, the conductor 825 being connected to an input transistor 851 of the PNP type, and particularly to the base 852 thereof. The emitter 854 of the transistor 851 is connected in a voltage-divider network including the resistors 855 and 856 connected in series with each other and between the grounded conductor 103 and a suitable source of operating potential (for example, +12 volts), the emitter 854 being more particularly connected at the junction between the resistors 855 and 856. The collector 853 of the transistor 850 is connected by a conductor 857 to a transistor 862 of the NPN type, and more particularly to the base 863 thereof. The collector 864 of the transistor 862 is connected through a resistor 866 to a suitable source of operating potential (for example, +12 volts), a capacitor 867 being provided in parallel with the resistor 866. The emitter 865 of the transistor 862 is connected by a conductor 868 to an output transistor 870 of the NPN type, and more particularly to the base 871 thereof. The emitter 873 of the transistor 870 is connected to the grounded conductor 103, and the collector 872 is connected to an output conductor 875. The conductor 875 is connected to the call-indicator annunciator 880 which as illustrated has a light bulb 881 having an input terminal 882 connected to the conductor 875 and an output terminal 883 connected to the source of operating potential (for example, +12 volts).

In the operation of the call-indicator system of the present invention, the operator at the transmitter 100 would first attempt to contact the operator at the receiver 400 by simply closing the transmit switch 160 (see FIG. 2) which would turn on the selected receiver 400. Obtaining no response from the operator of the receiver 400, the operator of the transmitter 100 would close a switch (not shown) in the call-indicator generator circuit 310 which would thereafter generate a call-indicator tone, it being understood that the circuit 310 may in fact be the oscillator 201 in combination with the frequency divider 203. The call-indicator tone so generated would be applied through the timing circuit 350 which will emit a series of pulses of predetermined duration and frequency of occurrence at the operating frequency of the call-indicator tone. In order to permit the operator to lock the output of call indicator on, a device has been provided in the form of a diode 858 having one terminal thereof connected to the conductor 825 and the other terminal thereof connected by a conductor 859 to a cutoff switch 860 which is further connected by a conductor 861 to the collector 864 of the transistor 862. Closure of the switch 860 serves to lock the switching circuit 850 on when triggered, thereby actuating the call-indicator annunciator 880 continuously when the required call-indicator tone of the required duration is received in the input transformer 801.

In the receiver 400, the tone control circuit 500 will typically already have operated to provide an output from the audio amplifier 470 (see FIG. 4), and accordingly, the call-indicator tone will be passed through the audio amplifier 470, the audio output amplifier 480, the audio output transformer 483 to the call-indicator input transformer 801 (see FIG. 8). The appearance of the required tone at the input transformer 801 will cause operation of the rectifying diodes 828 and 829 to produce a DC reference potential or bias on the conductor 832, the value of the reference potential being proportional to the strength of the total signal appearing on the conductor 808 and being negative in value with the circuit components arranged as illustrated. Only the call-indicator tone will be passed by the tone filter circuit including the capacitor 811, the inductor 813 and the capacitor 814 and through the capacitor 815 to the conductor 816. In order to achieve an output on the conductor 818, the call-indicator tone appearing on the conductor 816 must have a peak-to-peak value in excess of the bias on the conductor 832 before the diode 817 will conduct to provide an output on the conductor 818 to charge the output capacitor 819. In effect there is provided a filter followed by a voltage-doubler circuit which is biased in such a way that there is no DC output voltage at 818 until the bias provided at 832 is exceeded. Thus the bandwidth over which the tone will produce a DC output can be readily controlled by controlling the relationship between the filter output voltage and the bias voltage. With the particular filter shown, for example, capacitor 811 may be increased to produce a greater tone output and consequently a wider bandwidth or reduced to similarly produce a narrower bandwidth. The bandwidth over which a DC output voltage is obtained will be the bandwidth over which the transistor 820 may be actuated so as to produce an output. This bandwidth is substantially constant at all usable signal levels since the frequency at which the tone filter output and the DC bias outputs are equal will not change with signal level.

Even though the frequency of the call-indicator tone through the decoder 810 is correct and of sufficient amplitude, there will be not output from the output transistor 820 until the time delay circuit 840 has operated to render the transistor 820 conductive, as has been explained above. After the predetermined time delay fixed by the circuit 840, the continued application of the call-indicator tone signal of sufficient amplitude will cause an output from the transistor 820 on the conductor 825. The signal on the conductor 825 will operate the switching circuit 850 to render the transistor 870 conductive so as to operate the light 881. The light 881 will be turned on and off at the repetition rate of the bursts of call-indicator tone if the switch 860 is open as shown. If the switch 860 is closed the light will come on and stay on to indicate the unit has been called.

As pointed out above, there will be not output from the single tone circuit 810 until the value of the tone signal appearing on the conductor 816 has a peak-to-peak value in excess of the bias potential on the conductor 832 derived from the total signal. As a consequence, the circuit 810 has a substantial constant bandwidth versus tone signal level which is in turn determined by the amplitude versus frequency characteristics of the two paths through the input capacitors 811 and 826 respectively to the conductor 816. The circuit 810 can be adjusted so that an output control voltage is obtained over a very narrow frequency range compared to the bandwidth of the paging tone filter comprising the components 811, 813 and 814. The rise time of that filter will be the limiting factor in controlling the response time of the output rather than the narrow frequency range of control exhibited by the complete circuit 810, and in fact the total circuit 810 may be considered to be a "filter" which appears to have a response time which is much shorter than would be predicted by the bandwidth thereof. In this condition, it is pointed out that the total signal rectifier 510 in combination with the first tone switch 520 forms a single tone decoder of the same construction and characteristics as the single tone-decoder 810 described above, and likewise the total signal rectifier 510 in combination with the second tone switch 540 comprises a single tone decoder of the same construction and characteristics as the circuit 810 described above. Tone switches 520 and 540 further are voltage-doubler circuits provided with a DC bias by the total signal rectifier 510, which bias controls the bandwidth of both tone outputs as explained earlier.

In a typical operating example of the cell-indicator circuit 800 of FIG. 8, the various components thereof have the following values: the capacitors 811, 540 $\mu\mu$f.; the capacitor 826, 0.02 $\mu$f.; the capacitor 815, 820 $\mu\mu$f.; the resistor 830, 1 megohm; the capacitor 831, 0.02 $\mu\mu$f.; the capacitor 819, 0.02 $\mu$f.; the resistor 824, 3.9 megohms; the capacitor 841, 820 $\mu\mu$f.; the resistor 844, 6.8 megohms; the capacitor 845, 0.01 $\mu$f.; the resistor 846, 6.8 megohms; the capacitor 847, 0.2 $\mu$f.; the resistor 855, 4,700 ohms; the resistor 856, 4,700 ohms; the resistor 866, 1,000 ohms; and the capacitor 867, 0.02 $\mu$f.

The time delay circuit 840 also presents substantial advantages over prior circuits utilized heretofore, this circuit providing a DC output which in effect grounds the input to the transistor 820 for the time delay period. The output of the time delay 840 has an amplitude that varies with the output of the filter comprising the components 811, 813 and 814; in other words, the delay voltage generated by the circuit 840 is proportional only to the signal for the frequency at the resonance of the tone filter. Since the time delay of the circuit 840 and the output voltage from the decoder 810 are generated by the identical signal, the time delay is substantially constant regardless of the signal level of the call-indicator tone and regardless of what off-frequency signal may precede the call-indicator tone.

The details of construction of the monitoring circuit 900 are illustrated in FIG. 9 of the drawings, wherein it will be seen that the conductor 630 from the noise rectifier 620 (see FIGS. 4 and 6 also) is connected as the input to the monitor amplifier 910 and particularly to one terminal of an input resistor 911 which has the other terminal thereof connected to an amplifying transistor 912 of the NPN type, and specifically the base 913 thereof. The emitter 914 of the transistor 912 is connected to the grounded conductor 103, and the collector 915 is connected by the conductor 925 to one terminal of a resistor 916 having the other terminal thereof connected to one terminal of a rheostat 917, the rheostat 917 having a movable contact 918 thereon which connects to the other terminal thereof and is also connected to a source of operating potential (for example +20 volts DC).

The output from the monitor amplifier 910 appears on the conductor 925 and is applied as an input to the monitor switch 930, and specifically to a transistor 932 of the NPN type, and particularly to the base 933 thereof. The collector 935 of the transistor 932 is connected through a limiting resistor 936 to the source of operating potential, and the emitter 934 is connected to a transistor 937 of the NPN type, and particularly to the base 938 thereof. The emitter 939 of the transistor 937 is connected to the grounded conductor 103, and the collector 940 is connected by the conductor 945 to the monitor indicator 950. As illustrated in FIG. 9 the monitor indicator 950 is a lamp bulb 951 having one terminal 952 thereof connected to the conductor 945 and having the other terminal 953 connected to the source of operating potential.

When the receiver 400 does not have applied thereto the carrier signal of the frequency to which the receiver 400 is tuned, the noise rectifier 620 (see FIGS. 4 and 6) provides on the conductor 630 a substantial potential which cause heavy conduction of the transistor 912, and accordingly the bias on the conductor 925 is relatively low and the transistor 937 appears as an open circuit to the light bulb 951, thus preventing operation thereof. Upon the receipt by the receiver 400 of a carrier signal to which the receiver 400 is tuned, the noise rectifier 620 operates and the potential on the conductor 630 substantially decreases, and accordingly, there is less conduction of the transistor 912, thus increasing the potential on the conductor 925. Increasing the potential on the conductor 925 permits the transistor 937 to conduct and the current therefrom flows through the lamp 951 causing operation thereof. Operation of the lamp 951 tells the operator of the receiver 400 that the broadcasting channel assigned thereto is in use and therefore the operator will not attempt to operate his transmitter so long as the light 950 is operating, thus permitting the operator to monitor his assigned frequency channel continuously and without effort. The rheostat 917 provides for a control of the sensitivity of the monitoring system 900 by adjusting the level of the potential on the conductor 925.

In a typical example of the monitoring system 900, the various components thereof have the following values: the resistor 911, 3.9 megohms; the resistor 916, 100,000 ohms; the resistive element of the rheostat 917, 2 megohms; the resistor 936, 1,000 ohms.

The operation of the communication system of the present invention will now be described. Assuming first that an operator at the transmitter 100 wishes to call a selected receiver 400 using a sequence of two control tones, the power supply 104 (see FIG. 2) is energized so as to apply operating potential to the control tone oscillator 201 so that the oscillator 201 may achieve stable operating characteristics. The operator next places the switch 262 (see FIG. 3) in the position illustrated, namely grounded through the conductor 103, and then moves the contact arms 289 and 259 to select the first and second control tones, respectively. The frequency divider 203 will now be set to operate at a given submultiple of the 90,000-cycle frequency of the oscillator 201, but there will be no output from the transmitter 100 at this time. The operator next closes the transmit switch 160 which applies a potential along the conductor 115 which closes the transmit relay 111, thus to apply operating $B^+$ potential from the conductor 117 to all remaining components of the transmitter, whereby the transmitter 100 begins to operate and transmits the assigned fundamental carrier frequency thereof modulated at the frequency of the first control tone.

Application of the operating potential from the conductor 117 to the tone-control generating circuits 200 of FIG. 3 immediately causes the capacitor 216 to charge toward the 9-volt potential on the conductor 212 determined by the Zener diode 214. The transistor 221 will conduct heavily to provide a voltage drop across the resistors 227 and 242 that saturates the transistors 228 and 244 thus blocking the transistors 233 and 249, respectively. After a predetermined time interval of for example 175 milliseconds the voltage drop across the resistor 242 will be such as to block the transistor 244 which will permit the transistor 249 to begin conducting and thereby connecting the capacitor 256 and the capacitor selected by the contact arm 259 in the frequency-dividing components of the frequency divider 203; this serves to interrupt the first tone and immediately begin the second tone in the series of control tones. The second tone proceeds for about 60 milliseconds at which time the voltage drop across the resistors 227 and 242 in series will be so small that the transistor 228 blocks, thus permitting the transistor 233 to conduct and stop operation of the frequency divider 203.

In the meantime, the receiver 400 is normally continuously supplied with operating potential and is in readiness at all times to receive carrier signals supplied thereto. As soon as the operator of a transmitter 100 transmitting at the assigned frequency of the receiver 400 begins operation, the carrier signal and all modulation thereon including the control tones will be passed from the antenna 402 to the discriminator 460. Prior to the reception of the assigned carrier signal by the receiver 400, the noise rectifier 620 has provided a potential on the conductor 630 which holds the squelch tube 661 (see FIG. 6) heavily conducting, thereby holding the audio-amplifying tube 472 in an inoperative condition. The transistor 642 is also heavily conducting so as to apply a potential to the control grid of the squelch tube 661 also tending to render the audio-amplifying tube 472 inoperative, and if the switching circuit 700 is in the circuit it too is applying a potential to the control grid of the squelch tube 661 which holds the audio-amplifying tube 472 inoperative if an adjacent channel signal is being received. Application of the carrier signal of the proper frequency to the receiver 400 will cause the noise rectifier 620 to operate to remove the signal from the conductor 630 thus to remove one of the three biases from the squelch tube 661 tending to hold it heavily conducting thus to render the audio amplifier inoperative. A strong on-frequency carrier signal also will cause the switching circuit 700 to operate to remove any potential produced thereby from the control grid of the squelch tube 661.

The application of the first control tone of the series of two control tones on the assigned carrier signal will provide an input to the tone control circuit 500 which will cause the first tone switch 520 to be placed in a ready condition, whereby upon the termination of the first control tone, the tone switch 520 operates to place the circuit under the control of the second tone switch 540, and if the second control tone is immediately received by the receiver 400 and applied through the second tone filter 508 to the tone switch 540, the tone switch 540 will be placed in a ready condition so that upon the termination of the second control tone, a positive pulse will be applied through the capacitor 586 to the transistor 642 which will block the transistor 642 and thus remove the last potential from the control grid 663 of the squelch tube 661 which holds it heavily conducting, thus rendering the audio-amplifying tube 472 operative. In other words, the simultaneous concurrence of the proper signals from the tone-switching circuit 500, the noise rectifier 620 and the switching circuit 700 upon the control grid of the squelch tube 661 will change the squelch tube from a first condition substantially cutting off operation of the audio amplifier 470 to a second condition wherein the audio amplifier 470 can operate to amplify and pass the AC audio signal on the conductor 465 to the subsequent audio output stages.

The squelch tube 661 having once been placed in the second operating condition thereof wherein the audio-amplifying stage 470 is operative, a feedback circuit is established from the cathode of the amplifying tube 472 through the transistor 651 to the base of the transistor 642 which holds the transistor 642 substantially blocked or nonconducting, whereby the squelch circuit 660 is entirely under the control of the noise rectifier 620. Accordingly, the audio amplifier 470 will continue to operate so long as the carrier signal of the proper frequency is applied to the receiver 400. If the carrier signal is interrupted for a short period of time, the capacitor 586 and resistor 655 form a time delay circuit which will maintain the squelch circuit 660 under the control of the noise rectifier 620 for a period up to about 0.5 seconds; however, if the carrier signal is interrupted for a longer period of time, then the circuits revert to the original conditions thereof and the squelch circuit 660 is again under the control of the tone control circuit 500, the noise rectifier 620 and the switching circuit 700, and only a subsequent concurrence of the appropriate signals from all three circuits will again permit the squelch circuit 660 to be operated to the second condition thereof which permits operation of the audio amplifier 470.

If it is desired to use a series of three control tones rather than the series of two control tones described above, the operator at the transmitter 100 moves the switch arm 262 so that it is in contact with the conductor 263 and the three control tones are selected by moving the arms 289, 299 and 259, respectively. The receiver 400 must now have the circuit of FIG. 5A therein and the operator must have the switch 590A in contact with the conductor 516A and 599A closed as shown. With the parts so arranged, the tone control circuit 500A operates upon the application of the proper series of control tones thereto to actuate the squelch circuit to the second condition thereof wherein the audio amplifier 470 is operative. It is further pointed out that if additional control tones are desired in the series of control tones, for example four control tones rather than three, the transmitter can be modified by adding to the tone-generator circuit 200 thereof another set of circuits including the tone switching and timing circuit 240 and the tone selector 255. The receiver 400 must be correspondingly modified to add thereto to the circuit of FIG. 5A another series of circuits like the tone filter 504A, the tone switch 550A, transistor circuits 588A and 591A and 558A in the tone output and clamping circuit 570A.

If the operator of the transmitter 100 is unsuccessful in contacting the operator of the receiver 400, the operator of the transmitter 100 will then close the switch (not shown) that will begin operation of the call-indicator generator circuit 310 (see FIG. 2) and the motor driven cam timing circuit 350, whereby to transmit the call-indicator tone of a predetermined frequency, the call-indicator tone being transmitted as a series of bursts having predetermined time duration and repetition rate. Having already closed the transit switch 160 in prior efforts to contact the operator of the receiver 400, the receiver 400 will already have the output amplifier 470 operating and accordingly, will pass the bursts of call-indicator tone through the audio output amplifier 480 and the audio output transformer 483 to the call-indicator input transformer 801. The total signal appearing on the conductor 808 (see FIG. 8) will first establish a reference potential on the conductor 832; that portion of the signal on the conductor 808 at the frequency of the call-indicator tone will be developed on the conductor 812 which will immediately begin operation of the time delay circuit 840. If the call-indicator tone persists a length of time to permit the charging of the capacitor 847 in the time delay circuit 840, the transistor 820 will be rendered operative so that if the amplitude of the call-indicator tone on the conductor 816 is sufficient to overcome the bias on the conductor 832 an output will appear on the conductor 818 which will be amplified through the now operative transistor 820 and appear on the conductor 825. The signal thus transmitted to the conductor 825 will operate the switching circuit to render the transistor 870 operative thus energizing the light 881 and the call-indicator annunciator, the light 881 being for example the headlights of a vehicle.

From the above it will be seen that there has been provided an improved selective-calling communication system and improved components therefor including an improved control tone generator 200 in the transmitter, an improved call-indicator generating circuit 300 in the transmitter, an improved tone control circuit 500 in the receiver, an improved squelch circuit 660 in the receiver, an improved squelch-latching circuit, an improved call-indicator circuit 800 in the receiver, and an improved monitoring circuit 900 in the receiver which fulfill all of the objects and advantages set forth above.

Although there have been illustrated and described certain preferred embodiments of the invention, it is to be understood that various changes and modifications can be made therein without departing from the spirit and scope of the invention, and it is intended that all such changes and modifications be covered as fall within the scope of the appended claims.

1. In a communication system for selectively transmitting carrier signals carrying a control tone and a call-indicator tone and intelligence from a transmitter to at least one selected receiver, the combination comprising a transmitter including a tone-generating circuit for generating a preselected control tone, means for generating a call-indicator tone, a modulating circuit for modulating the carrier signals in accordance with the control tone and the control-indicator tone and the intelligence to be transmitted, a transmitter output circuit coupled to said modulating circuit for transmitting the carrier signals including the control tone and the call-indicator tone and the intelligence to be transmitted, a receiver including an input circuit for receiving the signals from said transmitter, a detecting circuit coupled to said input circuit for detecting the control tone and the call-indicator tone and the intelligence in the signals, an audio circuit for converting the intelligence into sound waves, a coupling circuit coupling said detecting circuit to said audio circuit for coupling the intelligence and the control tone thereto, a squelch circuit coupled to said coupling circuit and operative in a first condition thereof to render said coupling circuit inoperative and operative in a second condition thereof to render said coupling circuit operative, a first control circuit coupled to said squelch circuit an responsive to the application of the carrier signals to said receiver for generating a first control signal, a second tone control circuit coupled to said squelch circuit and responsive to the application of the control tone to said receiver for generating a second control signal, and squelch circuit being responsive to the application thereto of said first and second control signals for actuating said squelch circuit from the first condition thereof into the second condition thereof to render said coupling circuit operative to pass the call-indicator tone therethrough, means for maintaining said squelch circuit in the second condition thereof until the removal of said first control signal therefrom, a third tone control circuit coupled to said coupling circuit and responsive to the application thereto of the call-indicator tone from said coupling circuit for producing an output from said third tone control circuit, and a call-indicator annunciator coupled to said third control circuit and actuated by the output therefrom, whereby said receiver is operative to operate said call-indicator annunciator upon the application thereto of both the control tone and the call-indicator tone from said transmitter, the removal of said first control signal from said squelch circuit changing said squelch circuit from the second condition thereof to the first condition thereof to render said coupling circuit inoperative.

2. In a communication system for selectively transmitting intelligence from a transmitter to at least one selected receiver, a transmitter comprising a stable fixed-frequency oscillator for generating a first signal having a predetermined frequency, a nonoscillating-frequency divider coupled to said fixed-frequency oscillator for generating a plurality of control tones that are subharmonics of said first signal, a switching circuit coupled to said frequency divider for automatically changing the frequency division thereof to produce two or more preselected control tones in a predetermined order to provide a series of control tones, an output circuit coupled to said frequency divider for transmitting signals corresponding to the series of tones generated thereby and the intelligence to be transmitted, a source of operating potential for said fixed-frequency oscillator continually connected thereto so that said fixed-frequency oscillator is continuously operating at a stable operating frequency during the use of said transmitter, and a transmission control circuit coupled to said output circuit for applying operating potential thereto to effect transmission by said transmitter.

3. In a communication system for selectively transmitting signals including at least two control tones and intelligence from a transmitter to at least one selected receiver, a receiver comprising an input circuit for receiving signals from an associated transmitter, a detecting circuit coupled to said input circuit for detecting the control tone and the intelligence in the signals, a translating circuit coupled to said detecting circuit for translating the intelligence into a usable form, a squelch circuit coupled to said translating circuit and operative in a first condition thereof to render said translating circuit inoperative and operative in a second condition thereof to render said translating circuit operative, a first tone control circuit having an input coupled to said detecting circuit an having an output, a normally inoperative second tone control circuit having an input coupled to the output of said first tone control circuit and having an output coupled directly to said squelch circuit, said first tone control circuit being responsive to the application thereto and the subsequent removal therefrom of the first control tone for actuating said second tone control circuit from the inoperative condition to the operative condition thereof, said second tone control circuit being responsive to the application thereto and the subsequent removal therefrom of the second control tone when in the operative condition thereof for actuating said squelch circuit from the first condition thereof to the second condition thereof to render said translating circuit operative.

4. In a communication system for selectively transmitting signals including a series of control tones and intelligence from a transmitter to at least one selected receiver, a receiver comprising an input circuit for receiving signals from an associated transmitter, a detecting circuit coupled to said input circuit for detecting the control tones and the intelligence in the signals, a translating circuit coupled to said detecting circuit for translating the intelligence into a usable form, a squelch circuit coupled to said translating circuit and operative in a first condition thereof to render said translating circuit inoperative and operative in a second condition thereof to render said translating circuit operative, a plurality of tone control circuits corresponding in number to the control tones in the series of control tones, each of said tone control circuits having an input coupled to said detecting circuit and having an output, the second and each succeeding tone control circuit having an inoperative condition and an operative condition, the first tone control circuit having the output thereof coupled to said second control circuit and the second and each succeeding tone control circuit having the output thereof connected to the next tone control circuit, said first tone control circuit being responsive to the application thereto and the subsequent removal therefrom of the corresponding control tone for actuating said second control tone circuit from the inoperative condition to the operative condition thereof and the second and each succeeding tone control circuit being responsive to the application thereto and the subsequent removal therefrom of the corresponding control tone when in the operative condition thereof for actuating the next tone control circuit from the inoperative condition to the operative condition thereof and the last tone control circuit being responsive to the application thereto and the subsequent removal therefrom of the corresponding control tone when in the operative condition thereof for generating a control signal, and means for applying the control signal to said squelch circuit, the application of said control signal to said squelch circuit actuating said squelch circuit from the first condition thereof to the second condition thereof, thereby to render said translating circuit operative.

5. In a communication system for selectively transmitting carrier signals carrying a control tone and intelligence from a transmitter to at least one selected receiver, a receiver comprising an input circuit for receiving signals from an associated transmitter, a detecting circuit coupled to said input circuit for detecting the control tones and the intelligence in the signals, a translating circuit coupled to said detecting circuit for translating the intelligence into a usable form, a squelch circuit coupled to said translating circuit and operative in a first condition thereof to render said translating circuit inoperative and operative in a second condition thereof to render said translating circuit operative, a carrier control circuit coupled to said detecting circuit and responsive to the application of on-frequency carrier signals to said receiver for generating a first control signal, a switching circuit coupled to said detecting circuit and responsive to the application of off-frequency carrier signals to said receiver for generating a second control signal, a tone control circuit coupled to said detecting circuit and responsive to the application thereto of the control tone for generating a third control signal, means for applying said first control signal and said second control signal and said third control signal to said squelch circuit, the application of both said first control signal and said third control signal in the absence of said second control signal to said squelch circuit actuating said squelch circuit from the first condition thereof to the second condition thereof, thereby to render said translating circuit operative, the removal of said first control signal from said squelch circuit actuating said squelch circuit from the second condition thereof to the first condition thereof, thereby to render said translating circuit inoperative.

6. In a communication system for selectively transmitting carrier signals carrying a series of two control tones each of finite duration and intelligence from a transmitter to at least one selected receiver, said receiver comprising an input circuit for receiving the signals from an associated transmitter, a detecting circuit coupled to said input circuit to provide detected signals including the series of control tones and the intelligence, an audio circuit coupled to said detecting circuit for converting the detected signals into sound waves, a squelch circuit coupled to said audio circuit and operative in a first condition thereof to render said audio circuit inoperative and operative in a second condition thereof to render said audio circuit operative, a first control tone circuit having an input for receiving the detected signals and having an output, said first control tone circuit being responsive to the application thereto of the first control tone for producing at the output thereof a gating pulse occurring at least partly during the initial portion of the second control tone, a normally inoperative second control tone circuit having a first input for receiving the detected signals and having a second input coupled to the output of the first control tone circuit and having an output coupled to said squelch circuit, said second control tone circuit being rendered operative by the application thereto of the gating pulse and being responsive to a second control tone received while said second control tone circuit is operative to produce an output signal, said second control tone circuit being responsive to the termination of said output signal to produce at the output thereof a control signal, said control signal actuating said squelch circuit from the first condition thereof to the second condition thereof to render said audio circuit operative to produce sound waves in response to the detected signals, and means responsive to said output signal for maintaining said second control tone circuit operative for the duration of the second control tone to delay production of said control signal until termination of the second control tone, thereby to prevent the control tones from being converted into sound waves.

7. In a communication system for selectively transmitting carrier signals carrying a series of control tones each of finite duration and intelligence from a transmitter to at least one selected receiver, said receiver comprising an input circuit for receiving the signals from an associated transmitter, a detecting circuit coupled to said input circuit to provide detected signals including the series of control tones and the intelligence, an audio circuit coupled to said detecting circuit for converting the detected intelligence into sound waves, a squelch circuit coupled to said audio circuit and operative in a first condition thereof to render said audio circuit inoperative and operative in a second condition thereof to render said audio circuit operative, a plurality of control tone circuits corresponding in number to the control tones and each having an input for receiving the detected signals and each having an output, the first of said control tone circuits having the output thereof coupled to said second control tone circuit and the second and each succeeding control tone circuit having the output thereof coupled to the next succeeding one of said control tone circuits, said first control tone circuit being responsive to the application thereto of the first control tone for producing at the output thereof a gating pulse occurring at least partly during the initial portion of the second control tone, the second and each succeeding one of said control tone circuits being normally inoperative and being rendered operative by the application thereto of the gating pulse from the next preceding control tone circuit and being responsive to the associated control tone received while the associated control tone circuit is operative to produce at the output thereof a gating pulse occurring at least partly during the initial portion of the associated control tone, the last of said control tone circuits being rendered operative by the application thereto of the gating pulse from the next preceding control tone circuit and being responsive to the last control tone received while said last control tone circuit is operative to produce at the output thereof an output signal terminating prior to the termination of the last control tone, said last control tone circuit being responsive to the termination of said output signal to produce at the output thereof a control signal, means for applying said control signal to said squelch circuit for actuating said squelch circuit from the first condition thereof to the second condition thereof to render said audio circuit operative to produce sound waves in response to the detected signals, and means responsive to said output signal for maintaining said last control tone circuit operative for the duration of the last control tone to delay production of said control signal until termination of the last control tone, thereby to prevent the control tones from being converted into sound waves.

8. The receiver set forth in claim 7, wherein the gating pulses from said control tone circuits respectively commence substantially at the same time that the associated control tone terminates and the output.

9. The receiver set forth in claim 7, wherein the duration of each of said gating pulses is substantially shorter than the duration of the associated control tone to minimize the possibility of said audio circuit being rendered operative in response to control tones other than those to which the control tone circuits are respectively tuned.

10. The receiver set forth in claim 7, wherein the input of each of said control tone circuits is coupled to said detecting circuit.

11. In a communicating system for selectively transmitting intelligence from a transmitter to at least one selected receiver, the combination comprising a transmitter including a tone-generating circuit for generating a plurality of control tones, a first tone selector for coupling to said tone-generating circuit to preselect a first control tone to be transmitted, a second tone selector for coupling to said tone-generating circuit to preselect a second control tone to be transmitted, an electronic tone switching and timing circuit for automatically sequentially coupling said selectors to said tone-generating circuit to produce a series of the two preselected tones each with a finite duration, said tone switching and timing circuit substantially immediately switching from the first control tone in the series of preselected tones to the second control tone in the series of preselected tones, and a transmitter output circuit coupled to said tone-generating circuit for transmitting signals carrying the series of two control tones and the intelligence to be transmitted; and a receiver including an input circuit for receiving the signals from said transmitter, a detecting circuit coupled to said input circuit to provide detected signals including the series of control tones and the intelligence, a translating circuit coupled to said detecting circuit for converting the detected intelligence into a usable form, a squelch circuit coupled to said translating circuit and operative in a first condition thereof to render said translating circuit inoperative and operative in a second condition thereof to render said translating circuit operative, a first electrical filter for receiving the detected signals and operative to produce an output in response to a control tone having a frequency lying within a first band of frequencies containing the frequency of the first control tone, a first tone output circuit having an input coupled to said first electrical filter and having an output, said first tone output circuit being responsive to the application thereto of the first control tone for producing at the output thereof a gating pulse occurring at least partly during the initial portion of the second control tone and having a duration substantially shorter than the second control tone, a second electrical filter coupled to said input circuit and operative to produce an output in response to a control tone having a frequency lying within a second band of frequencies containing the frequency of the second control tone, a normally inoperative second tone output circuit having a first input for receiving the detected signals and having a second input coupled to the output of said first tone output circuit and having an output, said second tone output circuit being rendered operative by the application thereto of the gating pulse and being responsive to a second control tone received while said second control tone circuit is operative to produce an output signal, a reference circuit for providing a reference signal for said tone output circuits and operative to permit production of a gating pulse by said first tone output circuit only in response to a first control tone having a frequency lying within a band of frequencies narrower than said first band of frequencies and operative to permit production of said output signal by said second tone output circuit only in response to a second control tone having a frequency lying within a band of frequencies narrower than said second band of frequencies, and means responsive to said output signal to provide a control signal for actuating said squelch circuit from the first condition thereof to the second condition thereof to render said translating circuit operative to convert the detected intelligence into a usable form.

12. In a communication system for selectively transmitting intelligence from a transmitter to at least one selected receiver, the combination comprising a transmitter including a tone-generating circuit for generating a plurality of control tones, at least two tone selectors for individual coupling to said tone-generating circuit to preselect a series of control tones to be transmitted, an electronic tone switching and timing circuit for automatically sequentially coupling said selectors to said tone-generating circuit to produce a series of preselected tones each with a finite duration, said tone switching and timing circuit substantially immediately switching from the next preceding control tone in the series of preselected tones to the next succeeding control tone in the series of preselected tones, and a transmitter output circuit coupled to said tone-generating circuit for transmitting signals carrying the series of control tones and the intelligence to be transmitted; and a receiver including an input circuit for receiving the signals from said transmitter, a detecting circuit coupled to said input circuit to provide detected signals including the series of control tones and the intelligence, a translating circuit coupled to said detecting circuit for converting the detected intelligence into a usable form, a squelch circuit coupled to said translating circuit and operative in a first condition thereof to render said translating circuit inoperative and operative in a second condition thereof to render said translating circuit operative, a plurality of electrical filters corresponding in number to the control tones for receiving the detected signals and each being operative to produce an output in response to a control tone having a frequency lying within a band of frequencies containing the frequency of the control tone to which the associated filter is tuned, a plurality of tone output circuits corresponding in number to said electrical filters and each having an input coupled to the associated one of said electrical filters and each having an output, the first of said tone output circuits having the output thereof coupled to said second tone output circuit and the second and each succeeding tone output circuit having the output thereof coupled to the next succeeding one of said tone output circuits, said first tone output circuit being responsive to the application thereto of the first control tone for producing at the output thereof a gating pulse occurring at least partly during the initial portion of the second control tone and having a duration substantially shorter than the duration of the second control tone, the second and each succeeding one of said tone output circuits being normally inoperative and being rendered operative by the application thereto of the gating pulse from the next preceding tone output circuit and being responsive to the associated control tone received while the associated tone output circuit is operative to produce at the output thereof a gating pulse occurring at least partly during the initial portion of the associated control tone and having a duration substantially shorter than the associated control tone, the last of the tone output circuits being rendered operative by the application thereto of the gating pulse from the next preceding tone output circuit and being responsive to the last control tone received while said last control tone circuit is operative to produce at the output thereof an output signal, a reference circuit for providing a reference signal for said tone output circuits and operative to permit production of a gating pulse by said tone output circuits only in response to an associated control tone having a frequency lying within a band of frequencies narrower than the associated band of frequencies and operative to permit production of said output signal by the last of said tone output circuits only in response to an associated control tone having a frequency lying within a band of frequencies narrower than the associated band of frequencies, and means responsive to said output signal to provide a control signal for actuating said squelch circuit from the first condition thereof to the second condition thereof to render said translating circuit operative to convert the detected intelligence into a usable form.

13. The combination set forth in claim 12, wherein the duration of the series of control tones transmitted by said transmitter is no longer than on the order of 250 milliseconds.

14. The combination set forth in claim 12, wherein the gating pulse from each of said tone output circuits commences at the same time that the associated control tone terminates.

15. In a communication system for selectively transmitting intelligence from a transmitter to at least one selected receiver, the combination comprising a transmitter including a tone-generating circuit for generating a plurality of control tones, at least two tone selectors for individual coupling to said tone-generating circuit to preselect a series of control tones to be transmitted, an electronic tone switching and timing circuit for automatically sequentially coupling said selectors to said tone-generating circuit to produce a series of preselected tones each with a finite duration, a transmitter output circuit coupled to said tone-generating circuit for transmitting signals carrying the series of control tones and the intelligence to be transmitted, and means for rendering said electronic tone switching and timing circuit operative to cause said tone-generating circuit to produce a series of preselected control tones and for simultaneously rendering said transmitter output circuit operative to transmit both the series of control tones and the intelligence; and a receiver including an input circuit for receiving the signals from said transmitter, a detecting circuit coupled to said input circuit for detecting the control tones and the intelligence in the signals, a translating circuit coupled to said detecting circuit for translating the intelligence into a usable form, a squelch circuit coupled to said translating circuit and operative in a first condition thereof to render said translating circuit inoperative and operative in a second condition thereof to render said translating circuit operative, a carrier control circuit coupled to said detecting circuit and responsive to the application of the carrier signals to said receiver for generating a first control signal, a tone control circuit coupled to said detecting circuit and responsive to the application thereto and the subsequent removal therefrom of the series of control tones for generating a second control signal, means for applying said first control signal and said second control signal to said squelch circuit, this application of both said first control signal and said second control signal to said squelch circuit actuating said squelch circuit from the first condition thereof to the second condition thereof, thereby to render said translating circuit operative, and means for maintaining said squelch circuit in the second condition thereof upon the removal of said second control signal therefrom so long as said first control signal is applied thereto, the removal of said first control signal from said squelch circuit actuating said squelch circuit from the second condition thereof to the first condition thereof, thereby to render said translating circuit inoperative.

16. A communication system comprising:

transmitter for transmitting a signal including a radiofrequency carrier, modulating means for modulating said carrier, control means for initiating the operation of said modulation means for first causing said modulation means to modulate said carrier with a first frequency signal for a time period of predetermined limited duration and for immediately thereafter causing said modulation means to modulate said carrier with a different frequency signal to thereby cause said transmitter means to first transmit said carrier modulated by a burst of said first frequency signal and then transmit said carrier modulated by a second frequency signal, a receiver including means for receiving and demodulating the signal transmitted from said transmitter to provide an output including said burst of said first frequency signal followed by said second frequency signal, a normally operative first decoding circuit means and a normally inoperative second decoding circuit means each connected to be supplied with said output and a utilization circuit means controlled by said second decoding circuit means, said first decoding circuit means having means responsive to said burst of said first frequency signal in the output from said receiver for rendering said second decoding circuit operative for a time period of predetermined limited duration overlapping the time during which said output includes said second frequency signal, said second decoding circuit means having means responsive to said second frequency signal in the output of said receiver for causing energization of said utilization circuit means.